United States Patent
Kikuchi et al.

(10) Patent No.: US 8,531,558 B2
(45) Date of Patent: Sep. 10, 2013

(54) IMAGE PROCESSING APPARATUS, IMAGE PROCESSING METHOD AND ELECTRONIC EQUIPMENT

(75) Inventors: Koji Kikuchi, Kanagawa (JP); Shigeyuki Baba, Tokyo (JP); Toshifumi Wakano, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 13/359,088

(22) Filed: Jan. 26, 2012

(65) Prior Publication Data

US 2012/0206635 A1  Aug. 16, 2012

(30) Foreign Application Priority Data

Feb. 14, 2011  (JP) ................................. 2011-028631

(51) Int. Cl.
*H04N 17/00*  (2006.01)
*H04N 5/76*  (2006.01)
*H04N 5/217*  (2011.01)

(52) U.S. Cl.
USPC ...................... 348/241; 348/187; 348/231.3

(58) Field of Classification Search
USPC ............. 348/187, 188, 223.1–225.1, 231.3, 348/231.6, 241, 242, 273, 278–280; 382/260, 382/261
See application file for complete search history.

(56) References Cited

U.S. PATENT DOCUMENTS

| | | | |
|---|---|---|---|
| 7,102,669 B2* | 9/2006 | Skow | 348/222.1 |
| 7,561,194 B1* | 7/2009 | Luo | 348/241 |
| 2011/0058072 A1* | 3/2011 | Wang et al. | 348/242 |
| 2012/0092520 A1* | 4/2012 | Proca | 348/223.1 |

FOREIGN PATENT DOCUMENTS

JP  2009-124282  6/2009
WO  WO 2009142641 A1 * 11/2009

* cited by examiner

*Primary Examiner* — Timothy J Henn
(74) *Attorney, Agent, or Firm* — Rader, Fishman & Grauer PLLC

(57) ABSTRACT

Disclosed herein is an image processing apparatus including: a storage section configured to store a correction matrix correcting crosstalk generated by a light or electron leak from an adjacent pixel existing among a plurality of pixels for receiving light in an imaging device; and a processing section configured to carry out processing to apply the correction matrix stored in the storage section to an image signal generated by the imaging device for each of the pixels.

16 Claims, 20 Drawing Sheets

Blue

| -0.02 | -0.11 | -0.02 |
|---|---|---|
| -0.10 | 1.48 | -0.10 |
| -0.02 | -0.11 | -0.02 |

Gb

| -0.01 | -0.05 | -0.01 |
|---|---|---|
| -0.05 | 1.22 | -0.05 |
| -0.01 | -0.05 | -0.01 |

Gr

| -0.01 | -0.05 | -0.01 |
|---|---|---|
| -0.05 | 1.22 | -0.05 |
| -0.01 | -0.05 | -0.01 |

Red

| -0.01 | -0.05 | -0.01 |
|---|---|---|
| -0.04 | 1.19 | -0.04 |
| -0.01 | -0.05 | -0.01 |

FIG.15

```
START
  ↓
ACQUIRE LENS DATA         S11
  ↓
READ OUT BASIC MATRIXES   S12
  ↓
GENERATE CORRECTION MATRIX S13
  ↓
CORRECT CROSSTALK         S14
  ↓
END
```

FIG.16

Blue

| -0.03 | -0.18 | -0.03 |
|---|---|---|
| -0.18 | 1.86 | -0.18 |
| -0.03 | -0.18 | -0.03 |

Gb

| -0.01 | -0.07 | -0.01 |
|---|---|---|
| -0.07 | 1.34 | -0.07 |
| -0.01 | -0.07 | -0.01 |

Gr

| -0.01 | -0.07 | -0.01 |
|---|---|---|
| -0.07 | 1.32 | -0.07 |
| -0.01 | -0.07 | -0.01 |

Red

| -0.01 | -0.06 | -0.01 |
|---|---|---|
| -0.06 | 1.28 | -0.06 |
| -0.01 | -0.06 | -0.01 |

FIG.18

LIGHT CONVERGING STRUCTURE MATRIX

Blue

| 0.00 | 0.00 | 0.00 |
|---|---|---|
| 0.00 | 1.00 | 0.00 |
| 0.00 | 0.00 | 0.00 |

Gb

| 0.00 | -0.01 | 0.00 |
|---|---|---|
| -0.01 | 1.04 | -0.01 |
| 0.00 | -0.01 | 0.00 |

Gr

| 0.00 | -0.01 | 0.00 |
|---|---|---|
| -0.01 | 1.04 | -0.01 |
| 0.00 | -0.01 | 0.00 |

Red

| 0.00 | -0.02 | 0.00 |
|---|---|---|
| -0.02 | 1.08 | -0.02 |
| 0.00 | -0.02 | 0.00 |

PHOTODIODE MATRIX

Blue

| -0.03 | -0.18 | -0.03 |
|---|---|---|
| -0.18 | 1.86 | -0.18 |
| -0.03 | -0.18 | -0.03 |

Gb

| -0.01 | -0.06 | -0.01 |
|---|---|---|
| -0.06 | 1.30 | -0.06 |
| -0.01 | -0.06 | -0.01 |

Gr

| -0.01 | -0.06 | -0.01 |
|---|---|---|
| -0.06 | 1.28 | -0.06 |
| -0.01 | -0.06 | -0.01 |

Red

| -0.01 | -0.04 | -0.01 |
|---|---|---|
| -0.04 | 1.20 | -0.04 |
| -0.01 | -0.04 | -0.01 |

FIG.22

INCIDENCE ANGLE OF TEN DEGREES

Blue

| -0.01 | -0.13 | -0.04 |
|---|---|---|
| -0.04 | 1.66 | -0.27 |
| -0.01 | -0.12 | -0.04 |

Gb

| 0.00 | -0.06 | -0.02 |
|---|---|---|
| -0.02 | 1.26 | -0.10 |
| 0.00 | -0.05 | -0.01 |

Gr

| 0.00 | -0.06 | -0.01 |
|---|---|---|
| -0.02 | 1.26 | -0.10 |
| 0.00 | -0.05 | -0.01 |

Red

| 0.00 | -0.05 | -0.01 |
|---|---|---|
| -0.02 | 1.23 | -0.08 |
| 0.00 | -0.05 | -0.01 |

INCIDENCE ANGLE OF 20 DEGREES

Blue

| -0.01 | -0.17 | -0.07 |
|---|---|---|
| -0.09 | 2.00 | -0.45 |
| -0.01 | -0.15 | -0.06 |

Gb

| 0.00 | -0.08 | -0.03 |
|---|---|---|
| -0.03 | 1.40 | -0.17 |
| 0.00 | -0.07 | -0.02 |

Gr

| 0.00 | -0.06 | -0.02 |
|---|---|---|
| -0.03 | 1.36 | -0.16 |
| 0.00 | -0.06 | -0.02 |

Red

| 0.00 | -0.06 | -0.02 |
|---|---|---|
| -0.03 | 1.31 | -0.12 |
| 0.00 | -0.06 | -0.02 |

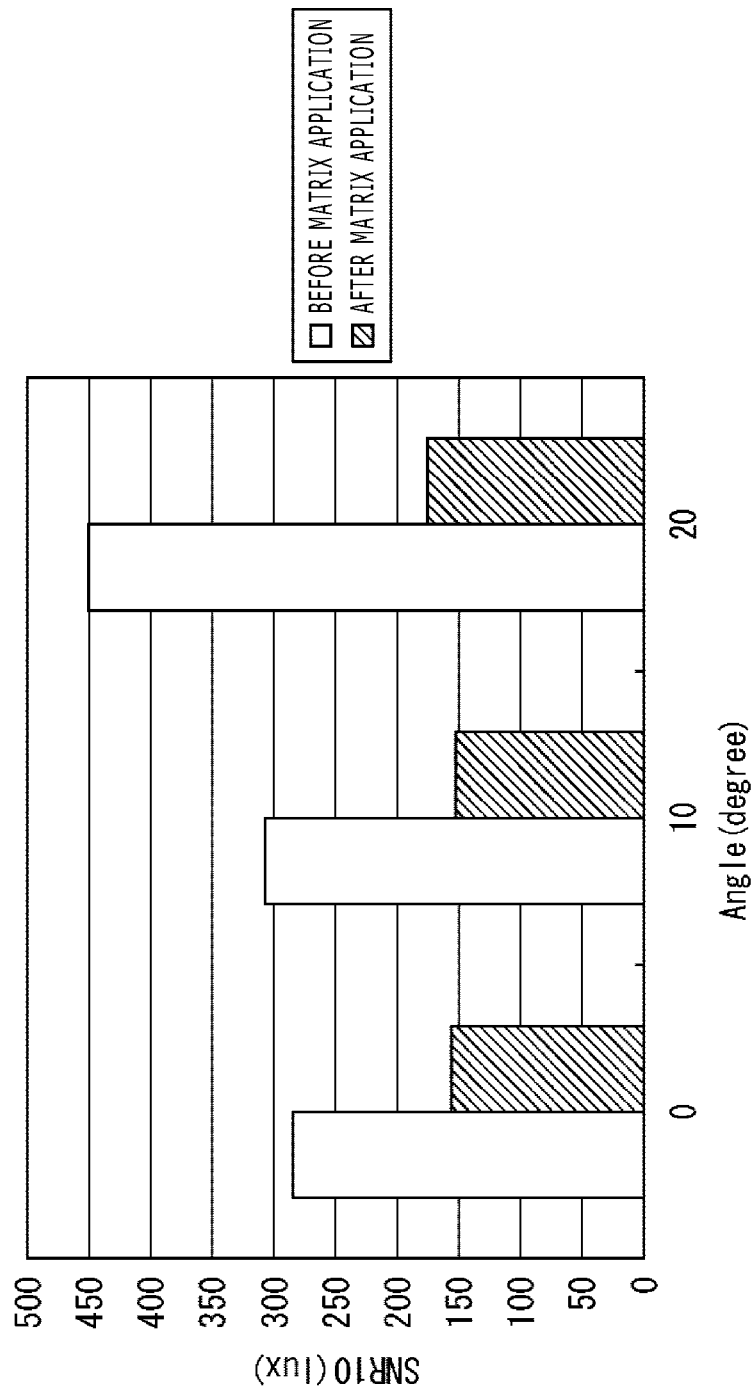

IMAGE PROCESSING APPARATUS, IMAGE PROCESSING METHOD AND ELECTRONIC EQUIPMENT

BACKGROUND

The present technology relates to an image processing apparatus, an image processing method and electronic equipment. More particularly, the present technology relates to an image processing apparatus capable of preventing the image quality from deteriorating and relates to an image processing method provided for the apparatus as well as electronic equipment employing the apparatus.

In the past, a solid-state imaging device represented by a CMOS (Complementary Metal Oxide Semiconductor) image sensor has always been required to have a smaller pixel size and a larger pixel count representing the number of pixels which can be provided in the same image area.

The configuration of an ordinary solid-state imaging device is explained by referring to FIGS. 1A to 1C as follows.

FIG. 1A shows a typical color filter 11 for a solid-state imaging device whereas FIG. 1B shows a cross section of a front-irradiation CMOS image sensor 21. FIG. 1C shows a cross section of a rear-irradiation CMOS image sensor 31.

The color filter 11 shown in FIG. 1A includes red, blue and green color filters which are laid out to in the so-called Bayer array. In the Bayer array, a number of pixels each having a cell positioned to face one of the color pixels are laid out in the horizontal and vertical directions. In the Bayer array, B (blue) and Gb (green) color filters are laid out alternately in the horizontal direction along a row so that each of the color filters faces the cell of one of pixels on the same row. By the same token, in the Bayer array, R (red) and Gr (green) color filters are laid out alternately in the horizontal direction along another row so that each of the color filters faces the cell of one of pixels on the same other row. That is to say, the pixels whose cells face the B (blue) and Gb (green) color filters are laid out in the horizontal direction in the Bayer array every other row whereas the pixels whose cells face the R (red) and Gr (green) color filters are laid out in the horizontal direction in the Bayer array also every other row. In addition, the pixels whose cells face the B (blue) and R (red) color filters are not laid out on the same column in the vertical direction.

It is to be noted that, in the following description, a pixel whose cell faces an R (red) color filter is referred to as an R pixel whereas a pixel whose cell faces a Gb (green) color filter is referred to as a Gb pixel. By the same token, a pixel whose cell faces a B (blue) color filter is referred to as a B pixel whereas a pixel whose cell faces a Gr (green) color filter is referred to as a Gr pixel.

The front-irradiation CMOS image sensor 21 shown in FIG. 1B is configured to have a silicon substrate 22 including a photodiode. In addition, the front-irradiation CMOS image sensor 21 also includes an FD (Floating Diffusion) 23 and a reflection prevention film 24. The reflection prevention film 24 is created on the silicon substrate 22 and the FD 23. A wiring layer 26 having wires 25 is created on the reflection prevention film 24. A flattening film 27 is created on the wiring layer 26 whereas a color filter 28 is created on the flattening film 27. Then, an on-chip lens 29 is provided on the color filter 28.

The rear-irradiation CMOS image sensor 31 shown in FIG. 1C is configured to have a silicon substrate 32 including a photodiode. In addition, the rear-irradiation CMOS image sensor 31 also includes a reflection prevention film 33 created on the silicon substrate 32. A light shielding film 34 for preventing crosstalk is created on the reflection prevention film 33. A flattening film 35 is created on the light shielding film 34 whereas a color filter 36 is created on the flattening film 35. Then, an on-chip lens 37 is provided on the color filter 36. It is to be noted that, in the case of the rear-irradiation CMOS image sensor 31, the on-chip filter 37 for receiving incident light is provided on the rear side and a wiring layer not shown in FIG. 1C is provided on the front side.

In the rear-irradiation CMOS image sensor 31, the wiring layer is not provided on the light-incidence side. Thus, incident light is not lost due to the wiring layer so that the amount of incident light arriving at the silicon substrate 32 can be increased to a quantity greater than that of the front-irradiation CMOS image sensor 21. As a result, by making use of the rear-irradiation CMOS image sensor 31, it is possible to obtain high-sensitivity, low-noise and high-quality image. Such rear-irradiation CMOS image sensors 31 are mass-produced and employed in electronic equipment such as a cam coder and a digital still camera.

By the way, since the number of pixels employed in a solid-state imaging device is increased, the absolute quantity of the energy of light incident to a pixel undesirably decreases and crosstalk inevitably occurs. In this case, the crosstalk is a phenomenon in which light leaks out to an adjacent pixel existing among pixels while the light is propagating through the device employing the pixels. In addition, the number of electrons obtained as a result of opto-electrical conversion taking place in the neighborhood of a pixel boundary rises, unavoidably increasing crosstalk as well. In this case, the crosstalk is a phenomenon in which electrons leak out to an adjacent pixel. As a result, these kinds of crosstalk increase. The generation of these kinds of crosstalk is a cause deteriorating the spectroscopic characteristic of the rear-irradiation CMOS image sensor 31.

Next, the spectroscopic characteristics of the rear-irradiation CMOS image sensor 31 are explained by referring to FIGS. 2A to 2C.

FIG. 2A shows spectroscopic characteristics found from signals output by a rectangular rear-irradiation CMOS image sensor 31 having a pixel size of 1.12 micrometers. In FIG. 2A, the horizontal axis represents the wavelength expressed in terms of nm whereas the vertical axis represents an output signal (arb. unit) which is the magnitude of a signal output by the rectangular rear-irradiation CMOS image sensor 31.

As shown in FIG. 2A, the pixel size has a value of an order not much different from the wavelength so that the color separation becomes poor.

FIG. 2B shows spectroscopic characteristics for a configuration including an on-chip filter. In FIG. 2B, the vertical axis represents the transmission (arb. unit) whereas the horizontal axis represents the wavelength lambda expressed in terms of micrometers.

The spectroscopic characteristics shown in FIG. 2B to serve as the spectroscopic characteristics for a configuration including an on-chip filter are compared with the spectroscopic characteristics shown in FIG. 2A as spectroscopic characteristics found from signals output by a rectangular rear-irradiation CMOS image sensor 31 in order to clarify the following. The deterioration of the color separation does not depend on the characteristic of the on-chip color filter, but depends on leaks of light or electrons (that is, signal electric charges) inside the rear-irradiation CMOS image sensor 31.

FIG. 2C shows spectroscopic characteristics found from signals output by a rectangular rear-irradiation CMOS image sensor 31 having a pixel size of 1.12 micrometers for a case in which the incidence angle of light incident to the light receiving surface of the rear-irradiation CMOS image sensor 31 is set at ten degrees. On the other hand, FIG. 2A described above shows spectroscopic characteristics found from signals output by a rectangular rear-irradiation CMOS image sensor 31 having a pixel size of 1.12 micrometers for a case in which the incidence angle of light incident to the light receiving surface of the rear-irradiation CMOS image sensor 31 is set at zero degree. By comparing the spectroscopic characteristics shown in FIG. 2A with those shown in FIG. 2C, it becomes obvious that an increase of the incidence angle of light incident to the light receiving surface of the rear-irradiation CMOS image sensor 31 emphasizes crosstalk.

In addition, for example, applicants for a patent of the present technology have also proposed an imaging apparatus capable of reducing effects on the image quality by carrying out pixel color mixing correction processing in accordance with a correction parameter (refer to, for example, Japanese Patent Laid-Open No. 2009-124282).

SUMMARY

The generation of crosstalk described above deteriorates the color-separation capability and worsens the color reproducibility. In addition, the generation of the crosstalk also undesirably lowers the SN ratio (Signal-to-Noise ratio). Thus, the quality of an image generated by the solid-state imaging device becomes poor.

It is desirable to address such problems to prevent the quality of the image from deteriorating.

An image processing apparatus according to an embodiment of the present technology includes:

a storage section configured to store a correction matrix for correcting crosstalk generated by a light or electron leak from an adjacent pixel existing among a plurality of pixels for receiving light in an imaging device; and a processing section configured to carry out processing to apply the correction matrix stored in the storage section to an image signal generated by the imaging device for each of the pixels.

An image processing method according to another embodiment of the present technology includes:

reading out a correction matrix from a storage section for storing the correction matrix for correcting crosstalk generated by a light or electron leak from an adjacent pixel existing among a plurality of pixels for receiving light in an imaging device; and carrying out processing to apply the correction matrix to an image signal generated by the imaging device for each of the pixels.

Electronic equipment according to a further embodiment of the present technology includes:

an imaging device having a plurality of pixels for receiving light;

a storage section configured to store correction matrix for correcting crosstalk generated by a light or electron leak from an adjacent pixel existing among the pixels employed in the imaging device; and a processing section configured to carry out processing to apply the correction matrix stored in the storage section to an image signal generated by the imaging device for each of the pixels.

In accordance with the embodiments of the present technology, the correction matrix for correcting crosstalk generated by a light or electron leak from an adjacent pixel existing among a plurality of pixels for receiving light in the imaging device is applied to an image signal generated by the imaging device for each of the pixels.

In accordance with the embodiments of the present technology, it is possible to prevent the image quality from deteriorating.

BRIEF DESCRIPTION OF THE DRAWINGS

FIG. 15 shows an explanatory flowchart to be referred to in description of processing carried out to correct crosstalk;

FIG. 16 is a diagram showing typical correction matrixes;

FIG. 18 is a diagram showing correction matrixes for a light converging structure and correction matrixes for a photodiode;

FIG. 22 is a diagram showing correction matrixes required for an incidence angle of ten degrees and correction matrixes for an incidence angle of 20 degrees; and FIG. 23 is a diagram showing typical SNR10 values obtained before and after application of correction matrixes.

DETAILED DESCRIPTION OF THE PREFERRED EMBODIMENT

Next, a concrete embodiment of the present technology is explained in detail by referring to the diagrams as follows.

Figure 3:
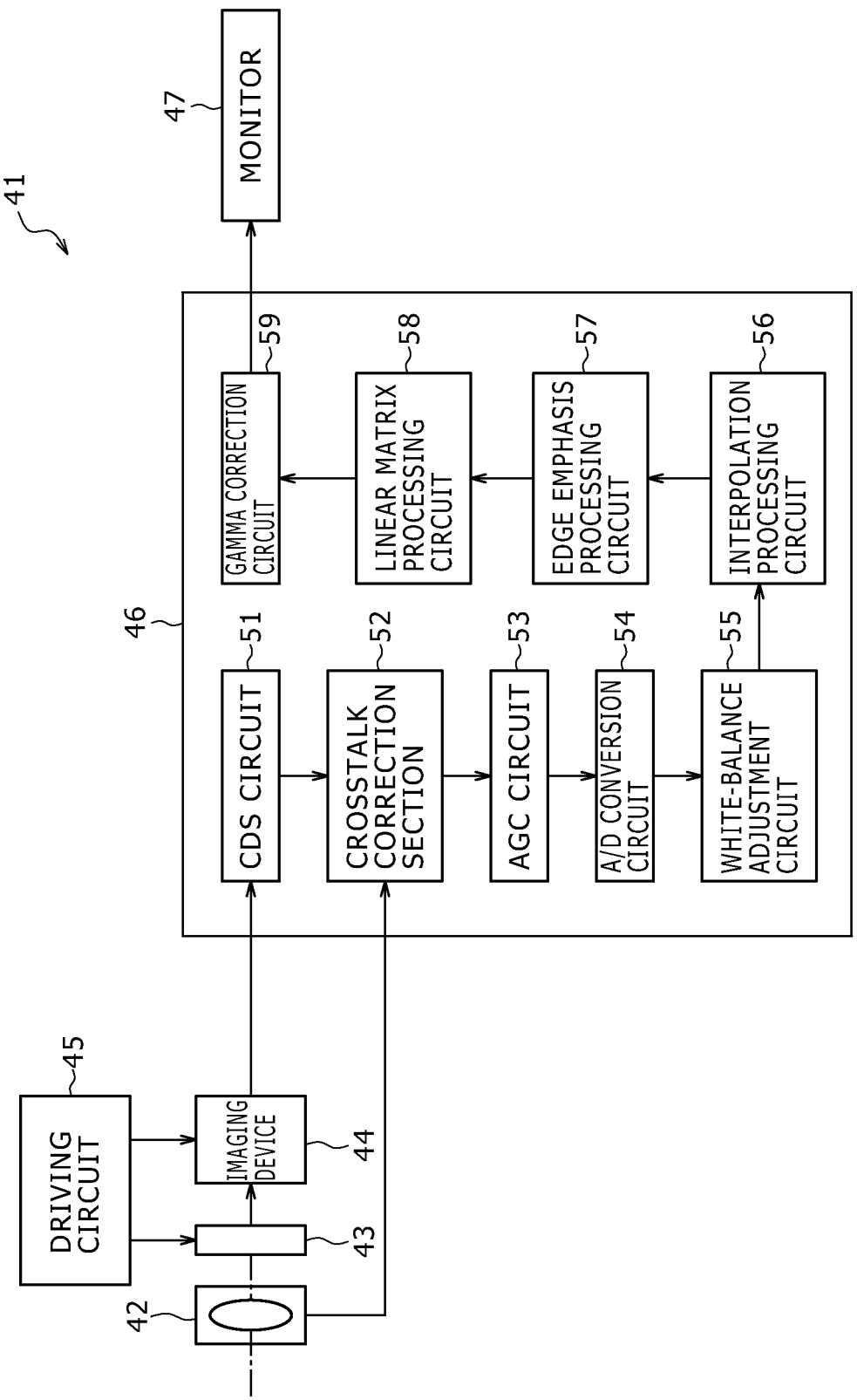
FIG. 3 is a block diagram showing a typical configuration of an imaging apparatus according to an embodiment of the present technology.

FIG. 3 is a block diagram showing a typical configuration of an imaging apparatus 41 according to an embodiment of the present technology.

In the configuration shown in FIG. 3, the imaging apparatus 41 is configured to include a lens unit 42, a shutter apparatus 43, an imaging device 44, a driving circuit 45, an image processing apparatus 46 and a monitor 47.

The lens unit 42 has one lens or a plurality of lenses. The lens unit 42 guides incident light radiated by an object of imaging to serve as image light to the imaging device 44, creating an image on a light receiving surface provided on the imaging device 44 to serve as a sensor section. In addition, the lens unit 42 is also used for storing an aperture ratio obtained by dividing the lens focal distance by the lens effective aperture.

The shutter apparatus 43 is provided between the lens unit 42 and the imaging device 44. In accordance with control executed by the driving circuit 45, the shutter apparatus 43 adjusts the period during which light is radiated to the imaging device 44 and a period during which the light radiated to the imaging device 44 is blocked.

Figure 1A:
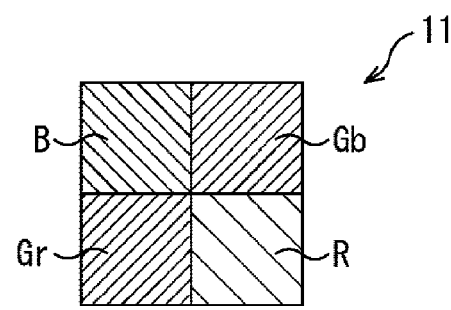
FIGS. 1A to 1C are diagrams showing configurations of ordinary solid-state imaging devices.
Figure 1B:
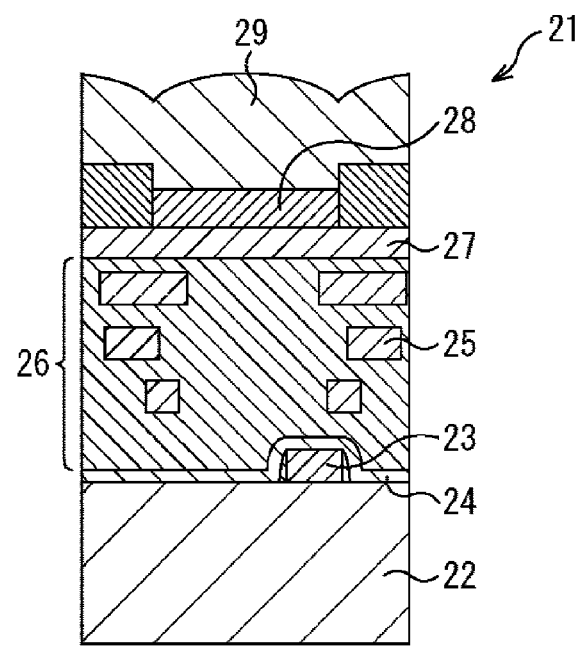
Figure 1C:
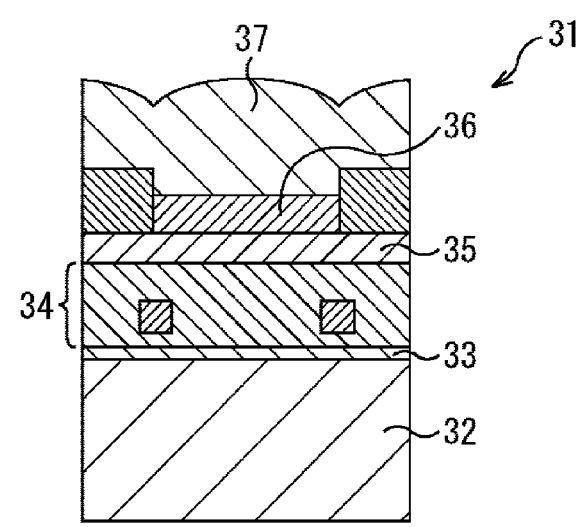

The imaging device 44 is typically the rear-irradiation CMOS image sensor 31 having the structure shown in FIG. 1C. The imaging device 44 accumulates signal electric charge for a fixed period in accordance with an image which is created on the light receiving surface by way of the lens unit 42 and the shutter apparatus 43. Then, the signal electric charge accumulated in the imaging device 44 is transferred to the image processing apparatus 46 in accordance with a timing signal supplied by the driving circuit 45 to the imaging device 44 to serve as a driving signal.

The driving circuit 45 outputs a driving signal to the imaging device 44 for driving the imaging device 44 to transfer the signal electric charge to the image processing apparatus 46. In addition, the driving circuit 45 also outputs a driving signal to the shutter apparatus 43 for driving the shutter apparatus 43 to carry out a shutter operation.

The image processing apparatus 46 carries out various kinds of image processing on an image signal (raw image data) output by the imaging device 44. Then, the image processing apparatus 46 provides the monitor 47 with image data obtained as a result of the image processing. The image processing apparatus 46 also outputs the image data to a recording medium not shown in the figure.

The monitor 47 typically has a liquid-crystal display unit or an organic EL (Electro Luminescence) display unit. The display unit is used for displaying an image according to the image data received from the image processing apparatus 46.

As shown in the figure, the image processing apparatus 46 is configured to include a CDS (Correlated Double Sampling) circuit 51, a crosstalk correction section 52, an AGC (Automatic Gain Control) circuit 53, an A/D (Analog/Digital) conversion circuit 54, a white-balance adjustment circuit 55, an interpolation processing circuit 56, an edge emphasis processing circuit 57, a linear matrix processing circuit 58 and a gamma correction circuit 59.

The CDS circuit 51 carries out processing to eliminate noises by performing correlated double sampling on an image signal received from the imaging device 44. The CDS circuit 51 supplies the image signal, whose noises have been eliminated, to the crosstalk correction section 52.

The crosstalk correction section 52 carries out correction processing to correct crosstalk for the signal received from the CDS circuit 51. In addition, while the crosstalk correction section 52 is carrying out the correction processing, the crosstalk correction section 52 may communicate with the lens unit 42 in order to obtain the present aperture ratio of a lens employed in the lens unit 42 if necessary.

The AGC circuit 53 automatically amplifies the signal received from the crosstalk correction section 52 in order to generate an amplified signal and outputs the amplified signal to the A/D conversion circuit 54. The A/D conversion circuit 54 converts the analog signal received from the AGC circuit 53 into a digital signal.

The white-balance adjustment circuit 55 carries out processing to adjust the white balance for an image constructed by the digital signal received from the A/D conversion circuit 54. The interpolation processing circuit 56 carries out interpolation processing in order to adjust the size of an image constructed by the signal received from the white-balance adjustment circuit 55. The interpolation processing circuit 56 outputs a signal obtained as a result of the interpolation processing to the edge emphasis processing circuit 57.

The edge emphasis processing circuit 57 carries out processing to emphasize the edges of an image constructed by the signal received from the interpolation processing circuit 56. It is to be noted that the image processing apparatus 46 also properly carries out image processing if necessary in addition to the processing to emphasize the edges of an image.

The linear matrix processing circuit 58 carries out correction based on matrix processing on an image constructed by the signal received from the edge emphasis processing circuit 57. The gamma correction circuit 59 carries out gamma correction on an image constructed by the signal received from the linear matrix processing circuit 58 in order to correct, among others, the colorfulness of an image to be displayed on the monitor 47 and the brightness of the image. The gamma correction circuit 59 outputs Y and C signals obtained as a result of the gamma correction to the monitor 47.

Figure 2A:
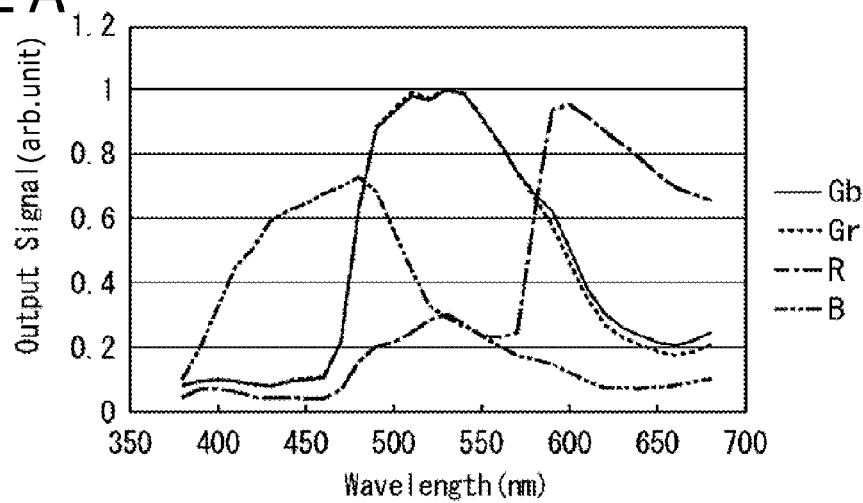
FIGS. 2A to 2C are diagrams showing spectroscopic characteristics of a rear-irradiation CMOS image sensor.
Figure 2B:
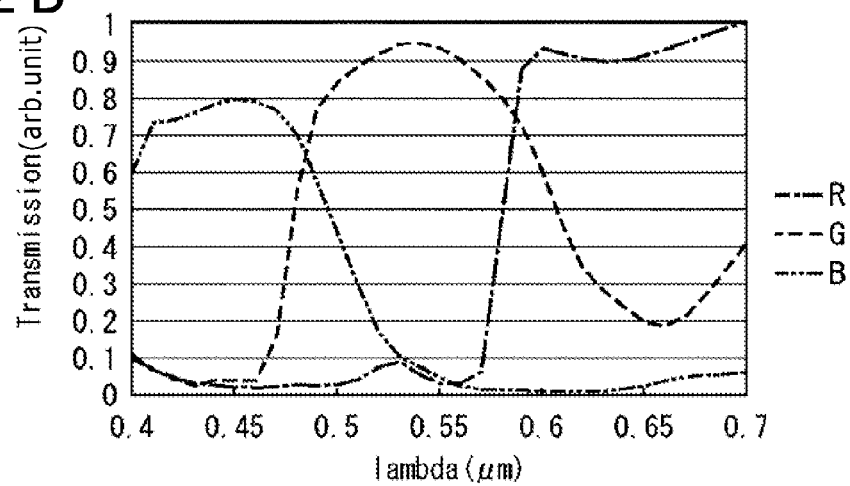
Figure 2C:
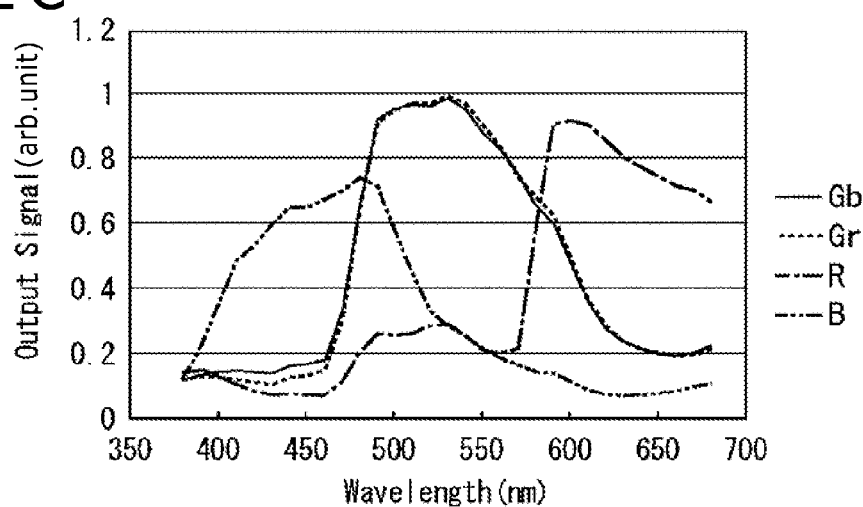

If the rear-irradiation CMOS image sensor 31 shown in FIG. 1C is used as the imaging device 44, spectroscopic characteristics found from a simulation of the rear-irradiation CMOS image sensor 31 are equivalent to those shown in FIGS. 2A to 2C. That is to say, crosstalk from the Gr pixel and crosstalk from the Gb pixel cause signals to leak into the R and B pixels respectively so that, in each of the R and B pixels, the output in a range of 500 to 550 nm rises. Thus, it is obvious that crosstalk exhibits dependence on the wavelength.

Next, the dependence of crosstalk on the wavelength is explained by referring to FIGS. 4 to 8. Each of FIGS. 4 to 7 is a diagram showing the amount of crosstalk from each of eight pixels provided at locations surrounding a pixel determined in advance for a variety of wavelengths. The eight pixels provided at locations surrounding the predetermined pixel are four pixels on respectively the upper, lower, right and left sides of the predetermined pixels and four other pixels separated away from the predetermined pixel in inclined directions. The eight pixels provided at locations surrounding the predetermined pixel are explained more as follows.

Figure 7:
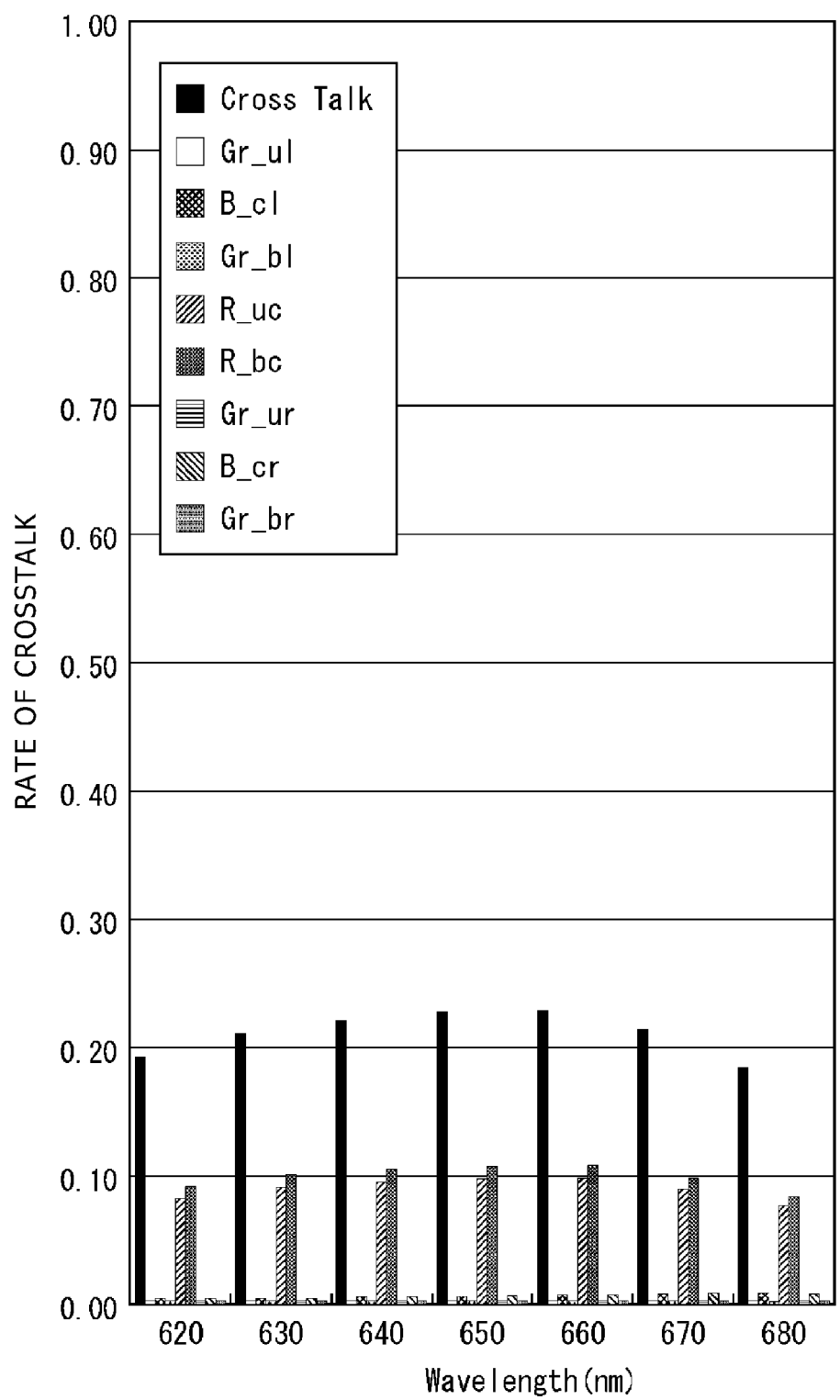
FIG. 7 is a diagram showing rates of crosstalk generated by surrounding pixels.
Figures 8, 9:
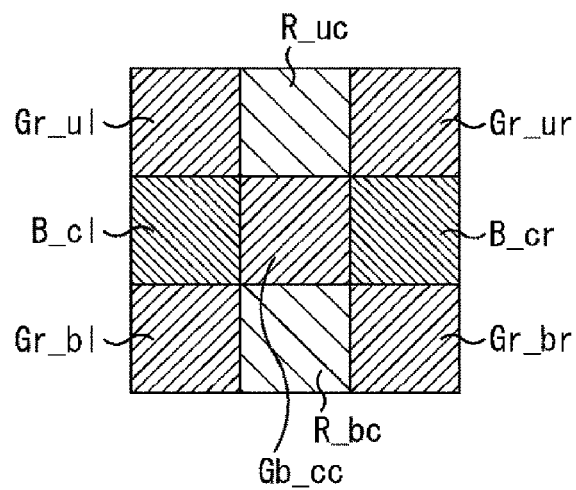
FIG. 8 is an explanatory diagram to be referred to in description of surrounding pixels.
FIG. 9 is a diagram showing typical correction matrixes.

FIG. 8 is a diagram showing a Gb_cc pixel at the center and the eight pixels provided at locations surrounding the Gb_cc pixel as described above. Each of FIGS. 4 to 7 shows the rate of crosstalk generated by each of the eight pixels provided at locations surrounding the Gb_cc pixel for each of a variety of wavelengths. As shown in FIG. 8, the eight pixels provided at locations surrounding the Gb_cc pixel are an adjacent Gr_ul pixel on the left upper side, an adjacent B_cl pixel on the left side, an adjacent Gr_bl pixel on the left lower side, an adjacent R_uc pixel on the upper side, an adjacent R_bc pixel on the lower side, an adjacent Gr_ur pixel on the right upper side, an adjacent B_cr pixel on the right side and an adjacent Gr_br pixel on the right lower side.

Figure 4:
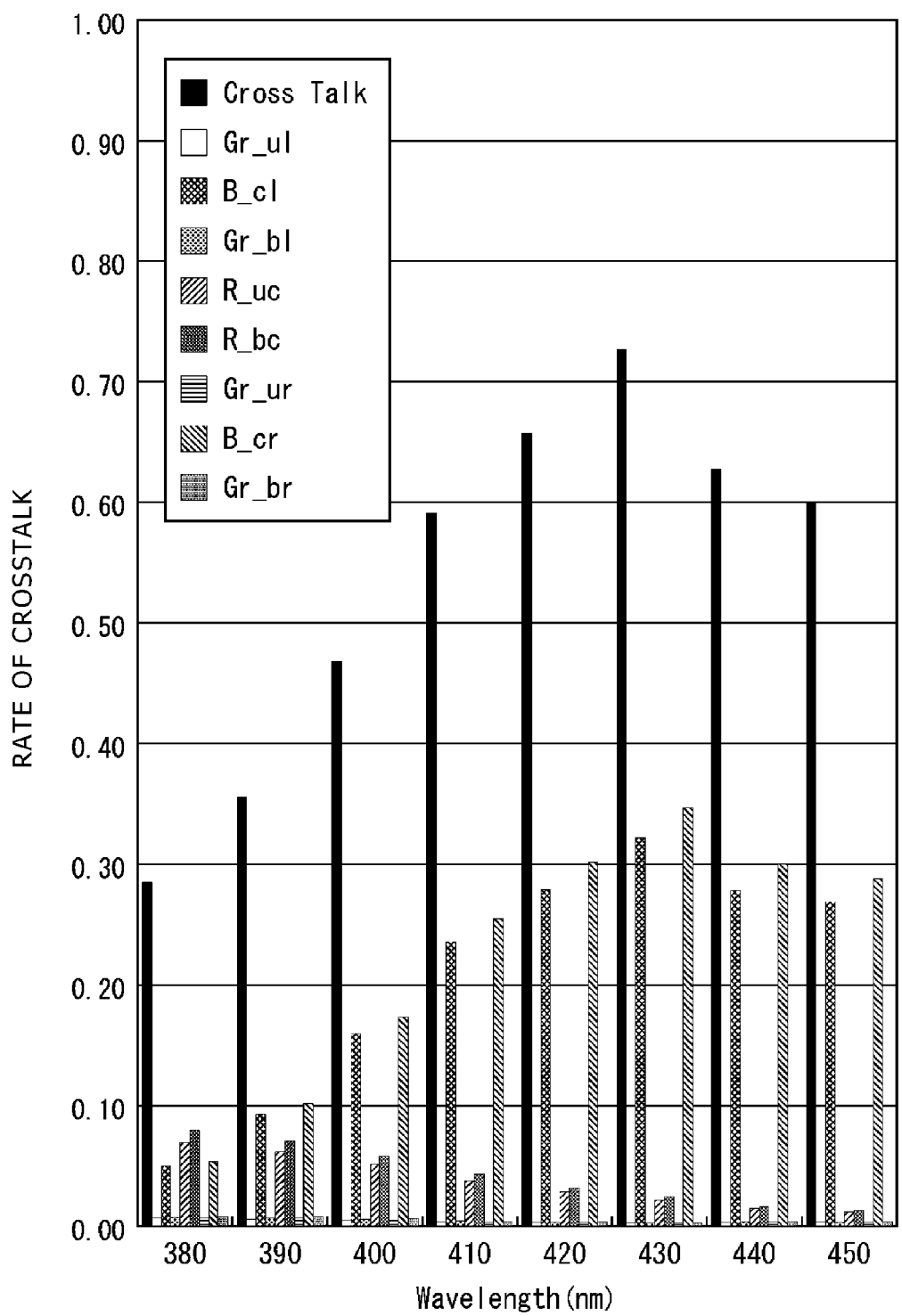
FIG. 4 is a diagram showing rates of crosstalk generated by surrounding pixels.
Figure 5:
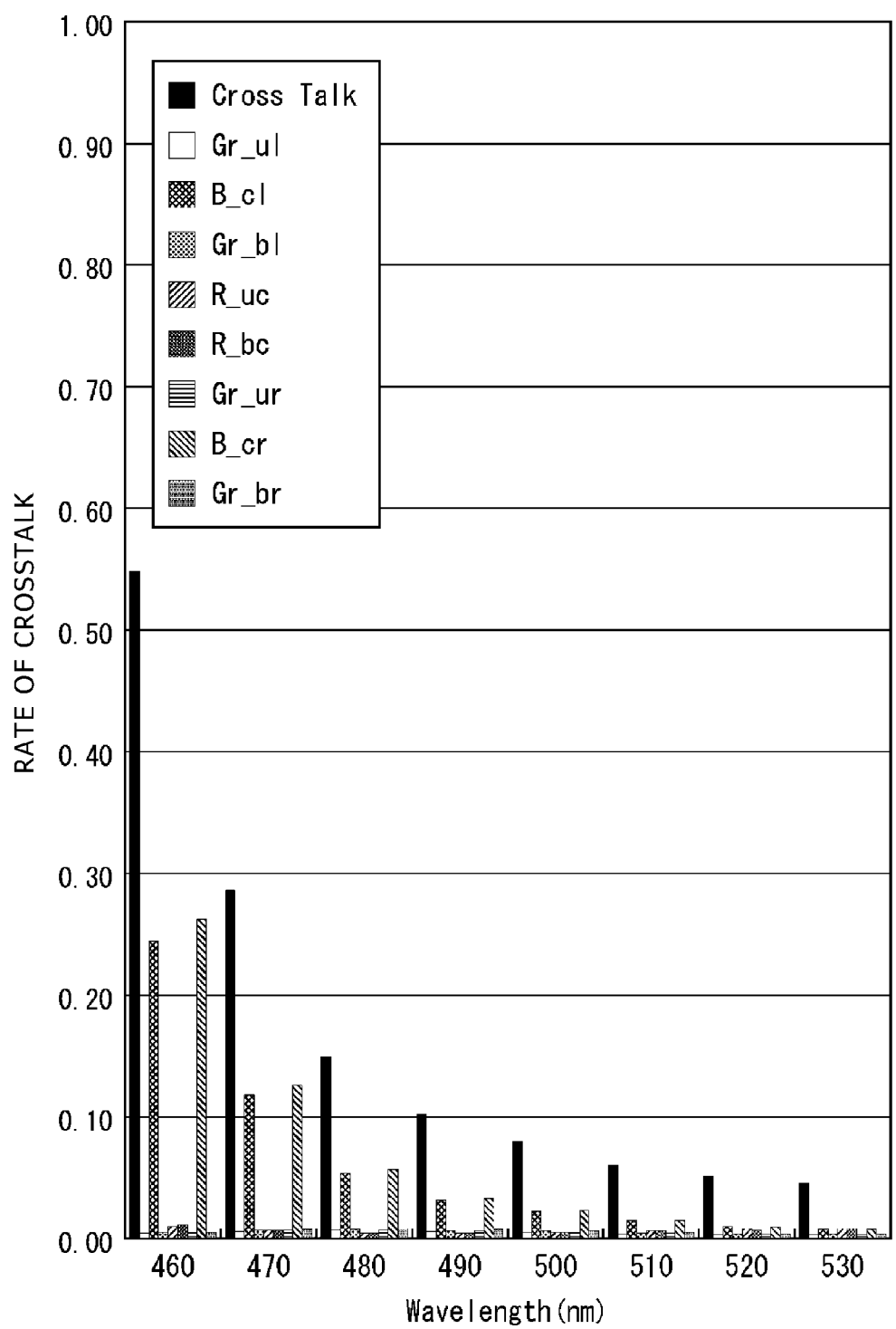
FIG. 5 is a diagram showing rates of crosstalk generated by surrounding pixels.
Figure 6:
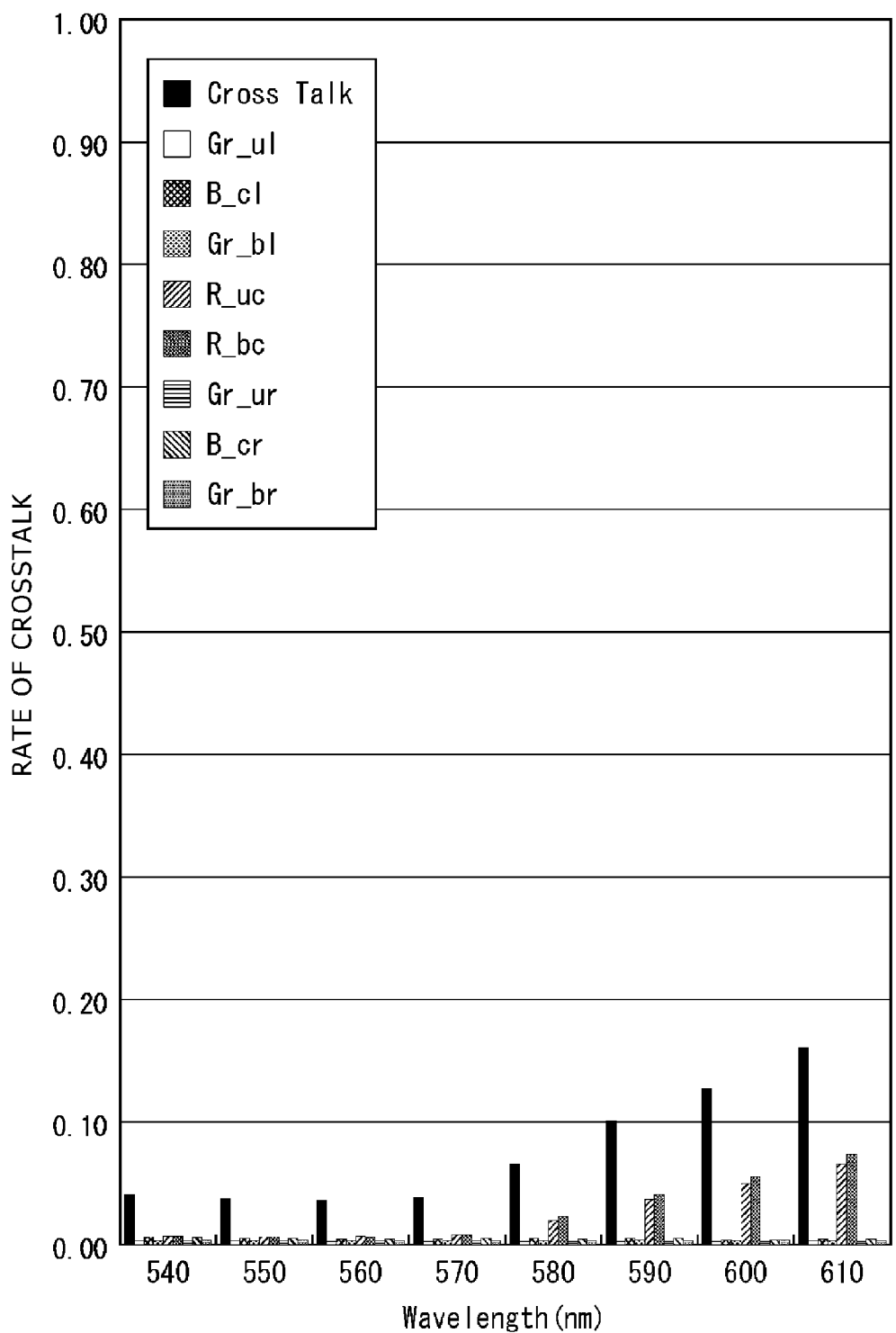
FIG. 6 is a diagram showing rates of crosstalk generated by surrounding pixels.

The horizontal axis in each of FIGS. 4 to 7 represents wavelengths. To be more specific, the horizontal axis in FIG. 4 represents wavelengths in a range of 380 nm to 450 nm whereas the horizontal axis in FIG. 5 represents wavelengths in a range of 460 nm to 530 nm. On the other hand, the horizontal axis in FIG. 6 represents wavelengths in a range of 540 nm to 610 nm whereas the horizontal axis in FIG. 7 represents wavelengths in a range of 620 nm to 680 nm. The vertical axis in each of FIGS. 4 to 7 represents the rate of crosstalk.

As is obvious from FIGS. 4 to 7, the rate of crosstalk from each of the four pixels separated away from the Gb_cc pixel at the center in inclined directions is low. As shown in FIG. 8, the four pixels separated away from the Gb_cc pixel are the adjacent Gr_ul pixel on the left upper side, the adjacent Gr_bl pixel on the left lower side, the adjacent Gr_ur pixel on the right upper side and the adjacent Gr_br pixel on the right lower side. On the other hand, as is also obvious from FIGS. 4 to 7, the rate of crosstalk from each of the four pixels located on the upper, lower, right and left sides of the Gb_cc pixel is high. The four pixels located on the upper, lower, right and left sides of the Gb_cc pixel are the adjacent R_uc pixel on the upper side, the adjacent R_bc pixel on the lower side, the adjacent B_cl pixel on the left side and the adjacent B_cr pixel on the right side. In addition, for small wavelengths such as wavelengths in a range of 400 nm to 470 nm, the amount of crosstalk from the B pixels is large.

As described above, from the eight pixels provided at the locations surrounding the Gb_cc pixel, the magnitudes of signals leaking into the Gb_cc pixel can be found. In other words, from the eight pixels provided at the locations surrounding the Gb_cc pixel, the signals having their magnitudes found by computation leak into the Gb_cc pixel. Thus, by restoring the leaking-signal magnitudes found by computation, the generated crosstalk can be virtually improved.

In addition, in the same way as the Gb pixel shown in FIGS. 4 to 7, for the Gr, B and R pixels each seen as the center pixel, it is possible to find the amount of crosstalk from the eight pixels provided at the locations surrounding the center pixel. Then, from the crosstalk amount found for each of the Gb, Gr, B and R pixels, the crosstalk correction section 52 is capable of carrying out processing to compute a correction matrix to be used in processing to correct the crosstalk.

First of all, from data like the one shown in FIG. 4, the magnitudes of signals leaking to the eight pixels provided at the surrounding locations are extracted for each of the Gb, Gr, B and R pixels. Then, the sum of the magnitudes of signals leaking to the eight pixels provided at the surrounding locations is found. Subsequently, the magnitudes of the leaking signals and the sum of the magnitudes of the leaking signals are normalized by dividing them by the magnitude of a signal output by the pixel. In the following description, the normalized numerical value is referred to as a mixed-color quantity ratio.

The correction matrix is expressed by expression (1) given below. In the correction matrix, notation a denotes the mixed-color quantity ratio of a signal leaking to the adjacent pixel located on the left upper side whereas notation b denotes the mixed-color quantity ratio of a signal leaking to the adjacent pixel located on the upper side. Notation c denotes the mixed-color quantity ratio of a signal leaking to the adjacent pixel located on the right upper side whereas notation d denotes the mixed-color quantity ratio of a signal leaking to the adjacent pixel located on the left side. Notation e denotes the mixed-color quantity ratio of a signal leaking to the adjacent pixel located on the right side whereas notation f denotes the mixed-color quantity ratio of a signal leaking to the adjacent pixel located on the left lower side. Notation g denotes the mixed-color quantity ratio of a signal leaking to the adjacent pixel located on the lower side whereas notation h denotes the mixed-color quantity ratio of a signal leaking to the adjacent pixel located on the right lower side.

$$\begin{bmatrix} -a & -b & -c \\ -d & 1+i & -e \\ -f & -g & -h \end{bmatrix} \quad (1)$$

In expression (1) given above, notation i denotes a numerical value satisfying the following equation: i=a+b+c+d+e+f+g+h.

It is to be noted that, if no mixed color is generated, the correction matrix is expressed by expression (2) given as follows.

$$\begin{bmatrix} 0 & 0 & 0 \\ 0 & 1 & 0 \\ 0 & 0 & 0 \end{bmatrix} \quad (2)$$

Thus, with each of the B, Gb, Gr and R pixels taken as the center pixel, a correction matrix can be computed for each of the B, Gb, Gr and R pixels.

FIG. 9 is a diagram showing typical correction matrixes computed from the crosstalk relations shown in FIGS. 3 to 7 for the B, Gb, Gr and R pixels.

As shown in FIG. 9, the correction quantities of the correction matrix for the B pixel are greater than the correction quantities of the correction matrixes for the other pixels. The fact that the correction quantities of the correction matrix for the B pixel are greater than the correction quantities of the correction matrixes for the other pixels indicates that the amount of crosstalk from the B pixel to the adjacent pixels is large.

Then, the correction matrixes for the B, Gb, Gr and R pixels are stored in the crosstalk correction section 52 which later makes use of the correction matrixes in carrying out processing to correct crosstalk.

Figure 10:
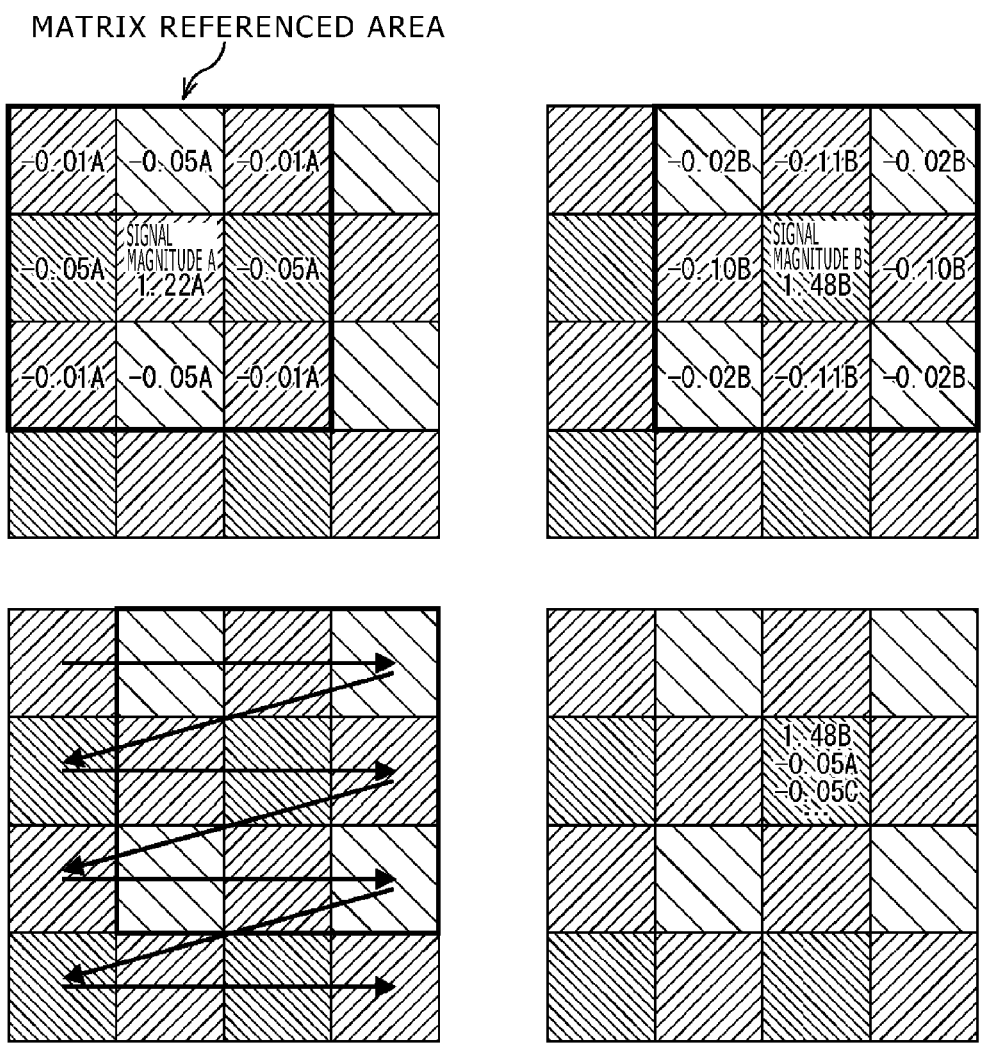
FIG. 10 is an explanatory diagram to be referred to in description of processing to correct crosstalk.

For example, as shown in FIG. 10, the crosstalk correction section 52 rebates the amount of crosstalk to the adjacent pixels in order to correct the crosstalk. That is to say, the crosstalk correction section 52 carries out processing to apply the correction matrixes shown in FIG. 9 to referenced areas taking the B, Gb, Gr and R pixels as center pixels. The crosstalk correction section 52 carries out this processing typically in the raster scan order. Then, for each of the B, Gb, Gr and R pixels, the crosstalk correction section 52 carries out processing (1.48B−10154A−0.05C . . . ) to rebate the magnitudes of signals leaking to the adjacent pixels in order to correct the crosstalk.

To put it concretely, the crosstalk correction section 52 carries out processing according to expression (3) given below in order to correct the crosstalk.

$$\begin{aligned} \text{Corrected\_Signal}(y, x) = {} & \text{Signal}(y, x) * Mcc(2, 2) - \\ & \text{Signal}(y-1, x-1) * Mul(3, 3) - \text{Signal}(y, x-1) * Mcl(2, 3) - \\ & \text{Signal}(y+1, x-1) * Mbl(1, 3) - \text{Signal}(y-1, x) * Muc(3, 2) - \\ & \text{Signal}(y+1, x) * Mbc(1, 2) - \text{Signal}(y-1, x+1) * Mur(3, 1) - \\ & \text{Signal}(y, x+1) * Mcr(2, 1) - \text{Signal}(y+1, x+1) * Mbr(1, 1) \end{aligned} \quad (3)$$

In expression (3) given above, notation Corrected_Signal (y, x) is an image signal obtained after correction to serve as an image signal at coordinates (x, y) whereas notation Signal (y, x) is an image signal at the coordinates (x, y).

Notation Mul denotes the correction matrix for the adjacent pixel located on the left upper side whereas notation Mcl denotes the correction matrix for the adjacent pixel located on the left side. Notation Mbl denotes the correction matrix for the adjacent pixel located on the left lower side whereas notation Muc denotes the correction matrix for the adjacent pixel located on the upper side. Notation Mcc denotes the correction matrix for the center pixel whereas notation Mbc denotes the correction matrix for the adjacent pixel located on the lower side. Notation Mur denotes the correction matrix for the adjacent pixel located on the right upper side whereas notation Mcr denotes the correction matrix for the adjacent pixel located on the right side. Notation Mbr denotes the correction matrix for the adjacent pixel located on the right lower side.

The value (i, j) enclosed in parentheses appended to each of the correction matrixes represents an element at the intersection of the ith row and the jth column in the correction matrix.

In addition, the crosstalk correction section 52 holds the correction matrix for each of the B, Gb, Gr and R pixels and carries out processing to correct crosstalk by making use of the correction matrix for each of the positions of the pixels.

The crosstalk correction section 52 corrects the crosstalk as described above in order to improve the spectroscopic characteristics.

Figure 11:
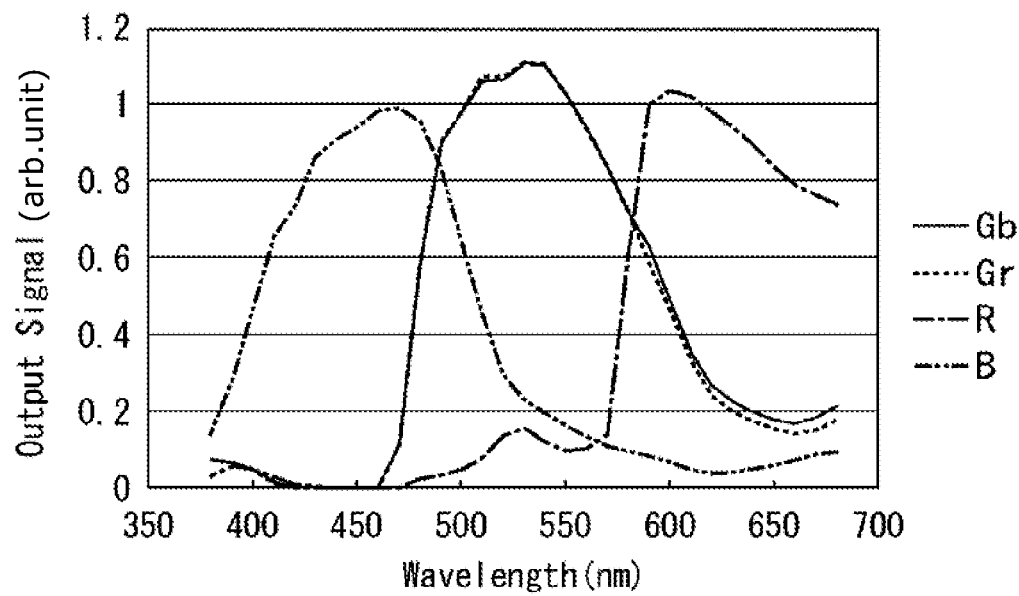
FIG. 11 is a diagram showing spectroscopic characteristics obtained as a result of the processing to correct crosstalk.

FIG. 11 is a diagram showing spectroscopic characteristics obtained as a result of the processing carried out by the crosstalk correction section 52 to correct crosstalk. In FIG. 11, the horizontal axis represents the wavelength expressed in terms of nm whereas the vertical horizontal represents the output signal (arb. unit).

As shown in FIG. 11, the spectroscopic characteristics are much improved. That is to say, in comparison with the spectroscopic characteristics shown in FIG. 2A as spectroscopic characteristics exhibited prior to the correction of the crosstalk, the spectroscopic characteristics shown in FIG. 11 as spectroscopic characteristics exhibited after the correction of the crosstalk are each expressed by a curve having an abrupt gradient.

Then, the spectroscopic characteristics exhibited prior to the correction of the crosstalk and the spectroscopic characteristics exhibited after the correction of the crosstalk are used to compute and apply the coefficient of the white balance and a linear matrix. Subsequently, the illumination intensity providing an SN ratio (Signal-to-Noise ratio) of 10 is found from each of the spectroscopic characteristics exhibited prior to the correction of the crosstalk and the spectroscopic characteristics exhibited after the correction of the crosstalk. In the following description, the illumination intensity providing an SNR of 10 is referred to as an SNR10 value.

It is assumed that, in the noises, 2.0 electrons are generated at random along with a dark current per pixel and the noises of the analog front end.

Figure 12:
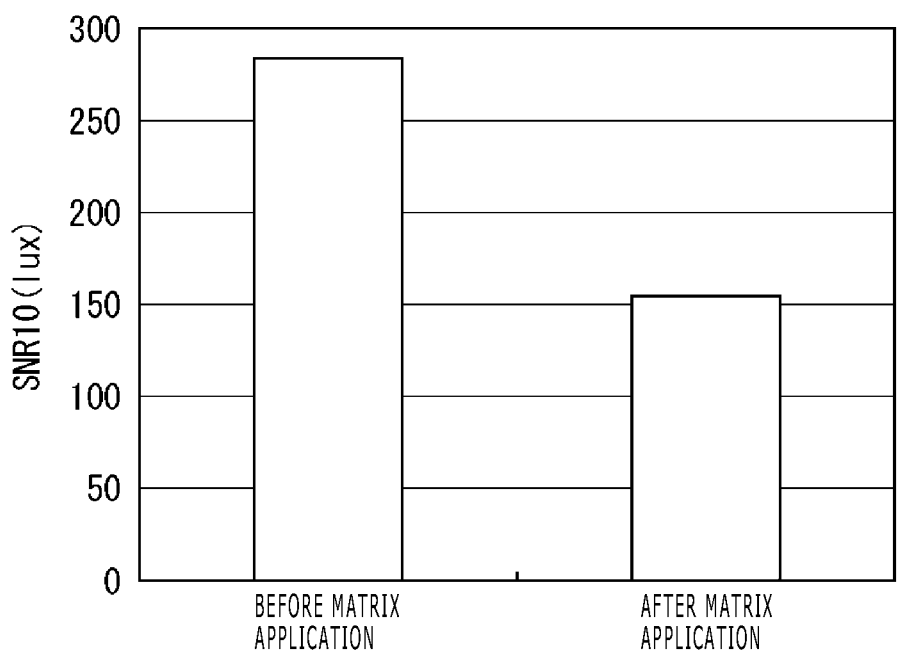
FIG. 12 is a diagram showing typical SNR10 values obtained from a spectroscopic characteristic exhibited before and after application of correction matrixes.

FIG. 12 is a diagram showing a typical SNR10 value obtained from a spectroscopic characteristic exhibited before application of the correction matrix and a typical SNR10 value obtained from a spectroscopic characteristic exhibited after application of the correction matrix.

As shown in FIG. 12, the SNR10 value obtained from a spectroscopic characteristic exhibited before application of the correction matrix is 284.2 luxes whereas the SNR10 value obtained from a spectroscopic characteristic exhibited after application of the correction matrix is 154.6 luxes.

Next, the following description explains a typical imaging operation carried out by an imaging device 44 including the rear-irradiation CMOS image sensor 31 shown in FIG. 1C and a lens unit 42 having an aperture ratio of 2.8.

If the aperture ratio of a lens included in the lens unit 42 increases, the number of inclined incident components rises so that the amount of crosstalk also increases as well. It is thus necessary to change the values of the correction matrixes used by the crosstalk correction section 52 in accordance with the aperture ratio. Accordingly, the imaging apparatus 41 is designed into a configuration allowing the crosstalk correction section 52 to make use of correction matrixes, whose values can be determined in accordance with the aperture ratio of a lens employed in the lens unit 42, in order to correct crosstalk.

Figure 13:
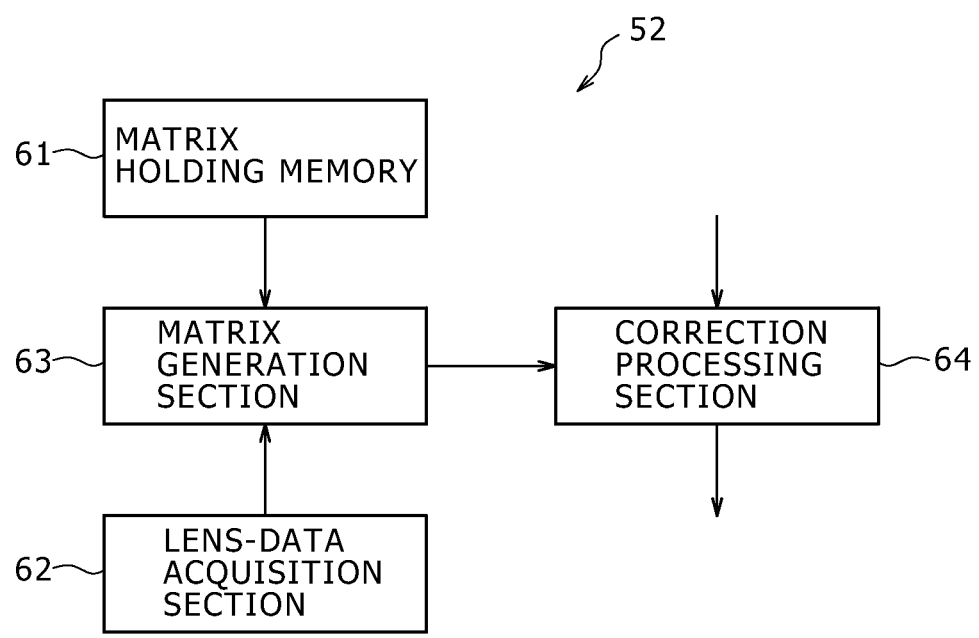
FIG. 13 is a block diagram showing a typical configuration of a crosstalk correction section.

FIG. 13 is a block diagram showing a typical configuration of the crosstalk correction section 52.

As shown in FIG. 13, the crosstalk correction section 52 is configured to include a matrix holding memory 61, a lens-data acquisition section 62, a matrix generation section 63 and a correction processing section 64.

The matrix holding memory 61 is used for storing a basic matrix, which is a matrix for each incidence angle, for each of the B, Gb, Gr and R pixels.

The lens-data acquisition section 62 communicates with the lens unit 42 in order to acquire the present aperture ratio of a lens employed in the lens unit 42. Then, the lens-data acquisition section 62 provides the matrix generation section 63 with three-dimensional angle information showing an incidence angle determined in accordance with the aperture ratio of the lens.

The matrix generation section 63 reads out two basic matrixes from the matrix holding memory 61 on the basis of the three-dimensional angle information, which has been received from the lens-data acquisition section 62, for each of the B, Gb, Gr and R pixels. The two basic matrixes read out from the matrix holding memory 61 are basic matrixes associated with two incidence angles closest to the incidence angle shown by the three-dimensional angle information received from the lens-data acquisition section 62. Then, for each of the B, Gb, Gr and R pixels, the matrix generation section 63 synthesizes the two basic matrixes read out from the matrix holding memory 61 in order to generate a correction matrix for each of the B, Gb, Gr and R pixels.

Figure 14:
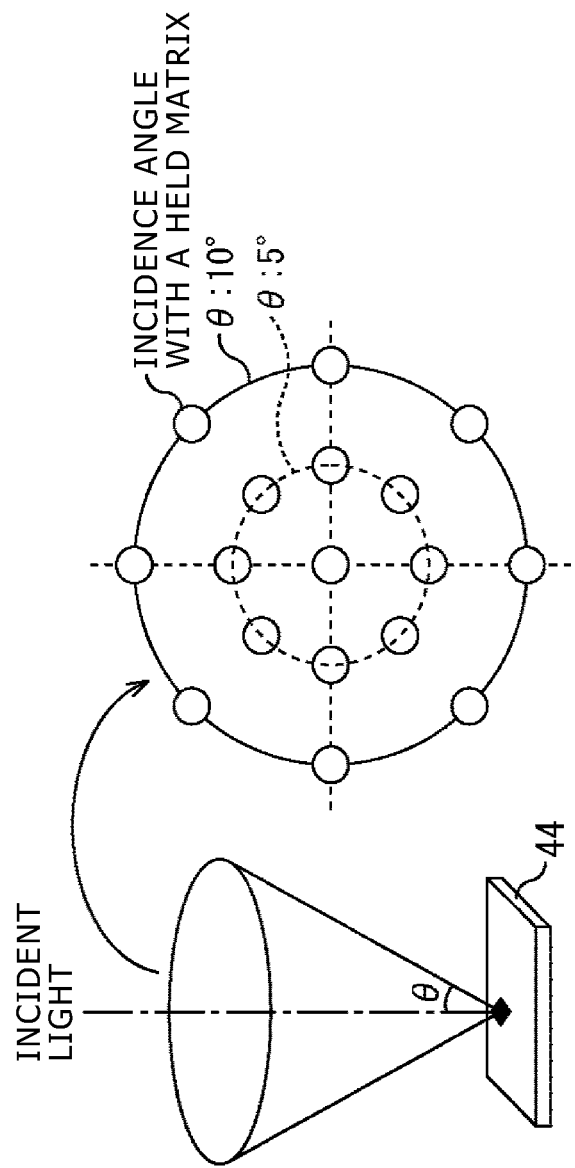
FIG. 14 is an explanatory diagram to be referred to in description of elements of a basic matrix for θ=five degrees and θ=ten degrees.

If the aperture ratio of the lens is 2.8 for example, incident light arrives in an inclined direction forming an angle of ±10.2 degrees in conjunction with the θ direction of a spherical coordinate system like one shown in FIG. 14. For this reason, typically, the matrix holding memory 61 is used for storing a basic matrix for every five degrees in the θ direction of the spherical coordinate system and every 45 degrees in the φ direction of the spherical coordinate system. In this case, the matrix generation section 63 generates a correction matrix for each of the B, Gb, Gr and R pixels from 17 pieces of data which are elements of basic matrixes stored for θ=five degrees and θ=ten degrees, supplying the correction matrixes to the correction processing section 64. For example, the matrix generation section 63 generates a correction matrix by carrying out linear interpolation on the basic matrixes associated with two incidence angles closest to the incidence angle shown by the three-dimensional angle information received from the lens-data acquisition section 62.

The correction processing section 64 receives sequentially image signals representing raw data from the CDS circuit 51 shown in FIG. 3. The correction processing section 64 carries out processing to apply the correction matrixes generated by the matrix generation section 63 to the image signal. That is to say, the correction processing section 64 carries out processing according to expression (3) given before in order to correct crosstalk for each of the B, Gb, Gr and R pixels. Then, the correction processing section 64 provides the AGC circuit 53 sequentially with the image signals whose crosstalk has been corrected.

FIG. 15 shows an explanatory flowchart to be referred to in description of processing carried out by the crosstalk correction section 52 shown in FIG. 13 to correct crosstalk.

Typically, the processing carried out by the crosstalk correction section 52 to correct crosstalk is started when the power supply of the imaging apparatus 41 shown in FIG. 3 is turned on. As shown in FIG. 15, the flowchart begins with a step S11 at which the lens-data acquisition section 62 communicates with the lens unit 42 in order to acquire the present aperture ratio of a lens employed in the lens unit 42. In addition, when the shutter apparatus 43 changes the aperture ratio later, the lens-data acquisition section 62 acquires the changed aperture ratio. Then, the lens-data acquisition section 62 provides the matrix generation section 63 with three-dimensional angle information showing an incidence angle determined in accordance with the aperture ratio of the lens.

After the step S11 has been completed, the flow of the processing goes on a step S12 at which the matrix generation section 63 reads out two basic matrixes from the matrix holding memory 61 on the basis of the three-dimensional angle information received from the lens-data acquisition section 62. Then, the flow of the processing goes on a step S13.

At the step S13, the matrix generation section 63 synthesizes the two basic matrixes at the step S12 in order to generate a correction matrix for each of the B, Gb, Gr and R pixels. Subsequently, the matrix generation section 63 supplies the correction matrixes to the correction processing section 64. Then, the flow of the processing goes on a step S14.

At the step S14, the correction processing section 64 carries out processing to apply the correction matrixes generated by the matrix generation section 63 to the image signals (raw data) received from the CDS circuit 51 sequentially in order to correct crosstalk for each of the B, Gb, Gr and R pixels. Then, the correction processing section 64 provides the AGC circuit 53 sequentially with the image signals whose crosstalk has been corrected.

As described above, the crosstalk correction section 52 carries out processing to correct crosstalk for an image signal and outputs an image signal whose crosstalk has been corrected. It is thus possible to construct an image on the basis of an image signal whose crosstalk has been corrected, prevent the quality of the image from deteriorating due crosstalk included in the image and obtain an image having a higher quality.

In addition, the matrix generation section 63 employed in the crosstalk correction section 52 generates a correction matrix for each of the B, Gb, Gr and R pixels on the basis of the present aperture ratio of the lens. FIG. 16 is a diagram showing four typical correction matrixes generated by the matrix generation section 63 for the B, Gb, Gr and R pixels. It is to be noted that, for a high aperture ratio of the lens, the amount of crosstalk is large. Thus, the absolute values of the elements composing each correction matrix are also large.

As described above, the matrix generation section 63 employed in the crosstalk correction section 52 generates a correction matrix for each of the B, Gb, Gr and R pixels on the basis of the present aperture ratio of the lens. It is thus possible to carry out proper correction of crosstalk in accordance with an incidence angle at which incident light arrives at the light receiving surface of the imaging device 44.

Figure 17:
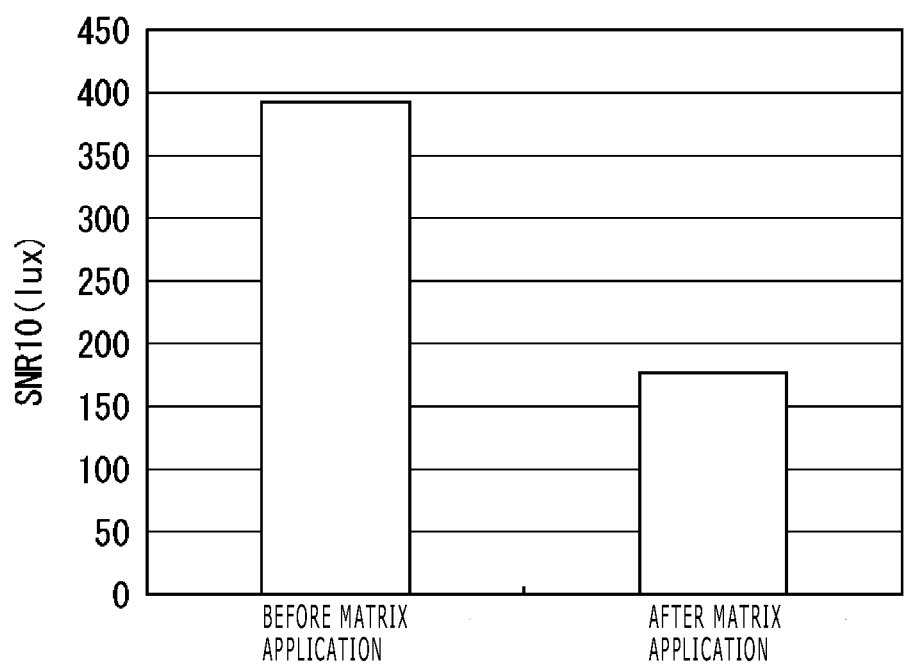
FIG. 17 is a diagram showing typical SNR10 values obtained before and after application of correction matrixes.

FIG. 17 is a diagram showing a typical SNR10 value obtained from a spectroscopic characteristic exhibited before application of the correction matrix and a typical SNR10 value obtained from a spectroscopic characteristic exhibited after application of the correction matrix. By taking the three-dimensional angle according to the aperture ratio of the lens into consideration, the typical SNR10 values shown in FIG. 17 can be improved over the SNR10 values shown in FIG. 12. As shown in FIG. 17, the typical SNR10 value obtained from a spectroscopic characteristic exhibited after application of the correction matrix is 175.0 luxes.

In addition, the crosstalk correction section 52 carries out processing to correct generation of crosstalk so that it is possible to raise the yield of the process to manufacture the imaging device 44. Thus, the manufacturing cost of the imaging device 44 can be reduced.

In addition, a basic matrix is stored in the matrix holding memory 61 for each of incidence angles separated away from each other by five degrees to serve as basic matrixes used in generating a correction matrix. Since a basic matrix is stored in the matrix holding memory 61 not for each incidence angle, it is possible to prevent the required storage capacity of the matrix holding memory 61 from increasing excessively and carry out correction of crosstalk on the basis of an incidence angle according to the present aperture ratio of the lens.

By the way, with down-sizing of the pixels composing the imaging device 44, crosstalk caused by a manufacturing parameter of the photodiode varies. That is to say, crosstalk generated in the imaging device 44 varies one by one. Thus, the crosstalk needs to be corrected by making use of a correction matrix proper for each imaging device 44. In this way, the correction precision can be improved.

In addition, the crosstalk generated in the imaging device 44 is crosstalk generated because light leaks to an adjacent pixel while the light is propagating in the imaging device 44 and crosstalk generated because electrons in the photodiode leak to an adjacent pixel. In the following description, a correction matrix used for correcting the crosstalk generated because light leaks to an adjacent pixel while the light is propagating in the imaging device 44 is referred to as a light converging structure matrix. On the other hand, a correction matrix used for correcting the crosstalk generated because electrons in the photodiode leak to an adjacent pixel is referred to as a photodiode matrix.

FIG. 18 is a diagram showing the light converging structure matrix and the photodiode matrix, which serve as two separated different matrixes composing a correction matrix, for an imaging operation carried out by making use of an imaging device 44 employing the rear-irradiation CMOS image sensor 31 shown in FIG. 1C and making use of a lens unit 42 having an aperture ratio of 2.8.

By correcting crosstalk on the basis of such two separated different matrixes composing a correction matrix, it is possible to obtain the same effects as the processing explained before by referring to the flowchart shown in FIG. 15. Since the correction matrix is split into the light converging structure matrix and the photodiode matrix as described above, it is possible to change the values of the elements of the light converging structure matrix and the values of the elements of the photodiode matrix independently of each other by taking values set at a device shipping inspection time as references.

Figure 19:
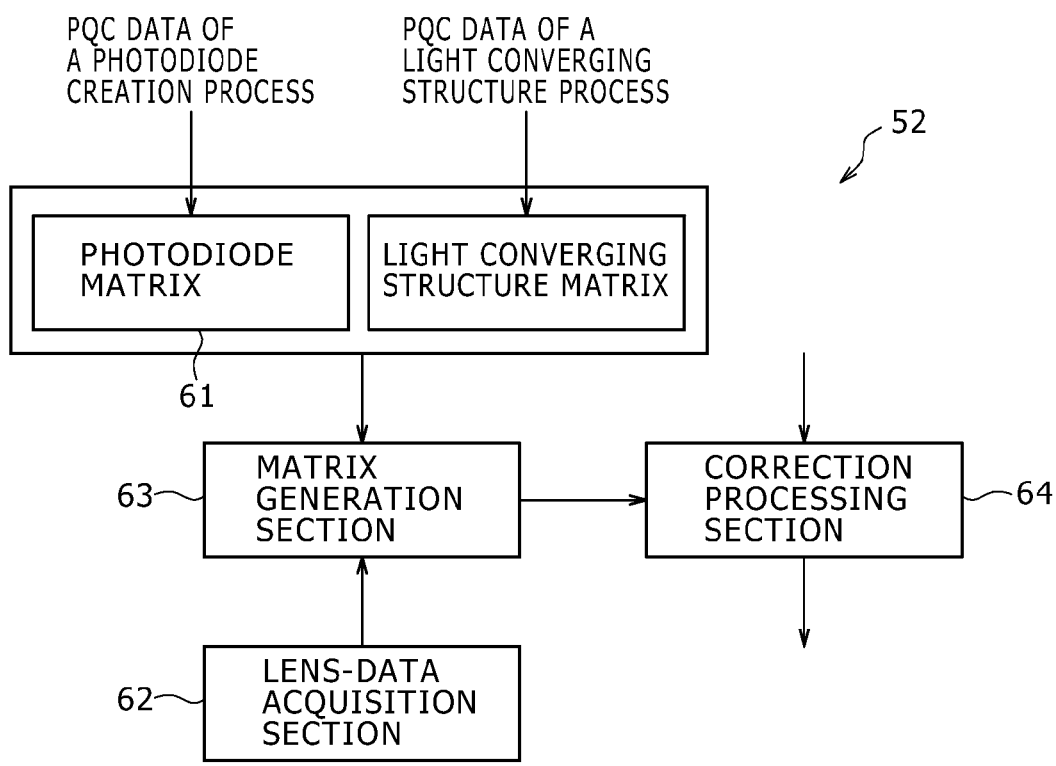
FIG. 19 is a block diagram showing a typical configuration of a crosstalk correction section.

That is to say, the matrix holding memory 61 is used for storing the light converging structure matrix found on the basis of PQC (Process Quality Control) data of a light converging structure process and the photodiode matrix found on the basis of the PQC data of a photodiode creation process as is the case with the crosstalk correction section 52 having a configuration like one shown in FIG. 19.

If a manufacturing error seeming to increase the crosstalk generated because electrons in the photodiode leak to an adjacent pixel for example, the absolute values of elements composing the photodiode matrix are increased in accordance with the magnitude of the detected manufacturing error. If an error seeming to place the on-chip lens 29 in FIG. 1B at a high position is detected, it is assumed that light of a large amount leaks to an adjacent pixel while the light is propagating in the imaging device 44. In this case, the absolute values of elements composing the light converging structure matrix are increased in accordance with the magnitude of the detected error.

As described above, it is possible to change the values of the elements of the light converging structure matrix and the values of the elements of the photodiode matrix independently of each other by taking values set at a device shipping inspection time as references. Thus, the correction precision of the processing to correct crosstalk can be improved. In addition, the light converging structure matrix and the photodiode matrix are found to serve as matrixes peculiar to each imaging device 44 and stored in the matrix holding memory 61 employed in the imaging apparatus 41.

By the way, in general, the imaging apparatus 41 employs a camera lens with the incidence direction varying from pixel to pixel. The incidence direction is a direction in which the incident light propagates to the light receiving surface of the imaging device 44. In particular, in the case of an imaging apparatus employed in a hand phone having a small size and a compact digital still camera having a small size, the lens needs to be designed to have a short injection eye relief.

Thus, if the incidence angle varies from pixel to pixel as described above, the amount of crosstalk also varies from pixel to pixel as well.

Figure 20:
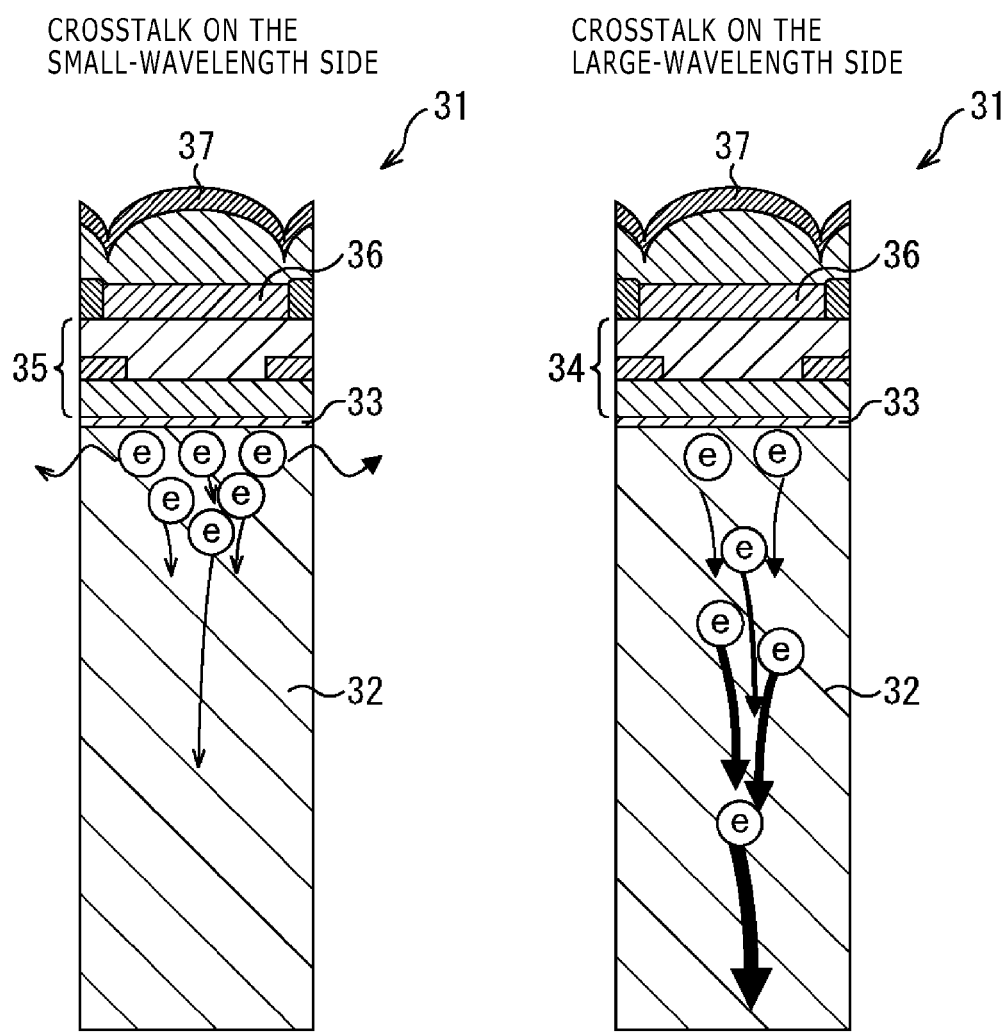
FIG. 20 is a diagram showing a model of movements made by electrons in a rear-irradiation CMOS image sensor when incident light arrives at the light receiving surface of the sensor in a direction perpendicular to the surface.
Figure 21:
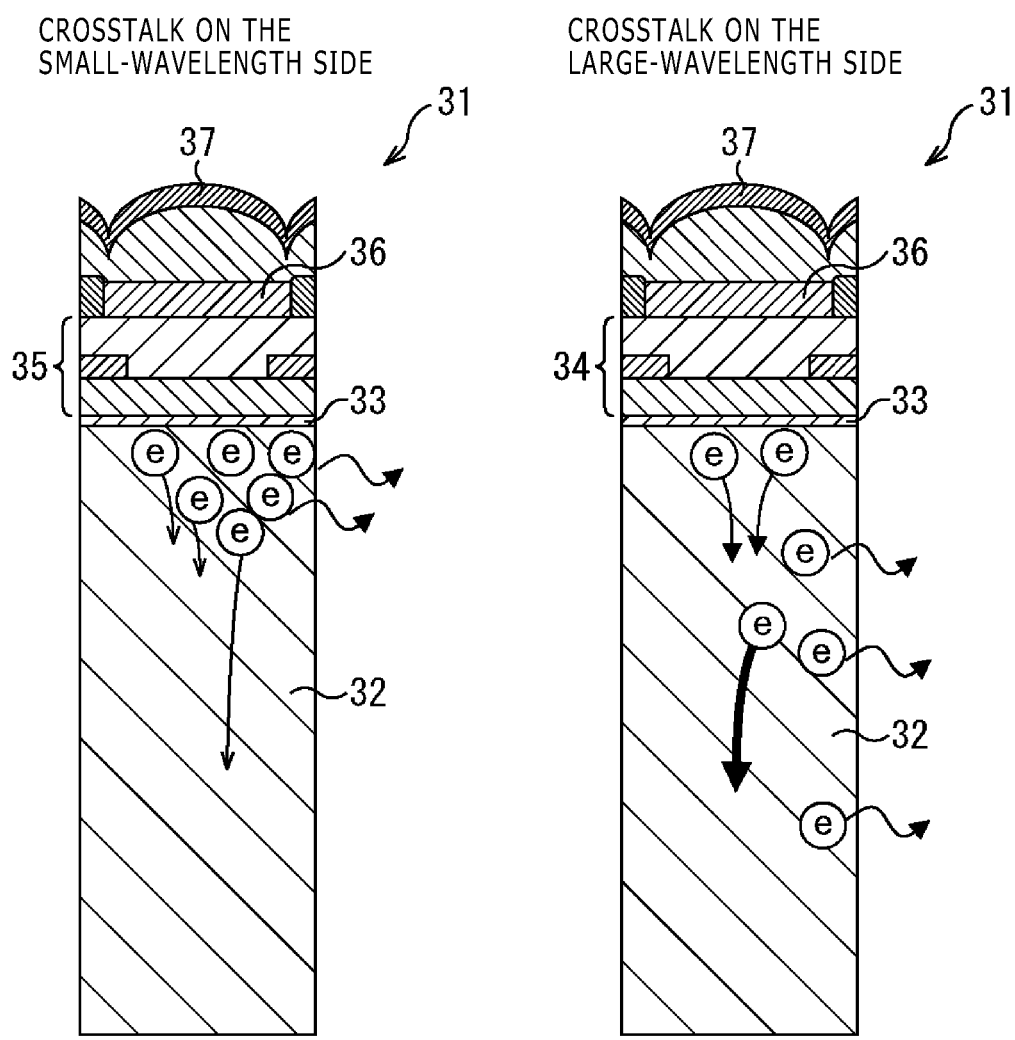
FIG. 21 is a diagram showing a model of movements made by electrons in a rear-irradiation CMOS image sensor when incident light arrives at the light receiving surface of the sensor in an inclined direction with respect to the surface.

FIG. 20 is a diagram showing a typical model of movements made by electrons in the rear-irradiation CMOS image sensor 31 when incident light arrives at the light receiving surface of the sensor 31 in a direction perpendicular to the surface. On the other hand, FIG. 21 is a diagram showing a typical model of movements made by electrons in the rear-irradiation CMOS image sensor 31 when incident light arrives at the light receiving surface of the sensor 31 in an inclined direction with respect to the surface. It is to be noted that, in FIGS. 20 and 21, the thickness of an arrow associated with an electron represents the easiness of a movement indicated by the arrow as a movement of the electron.

As shown in FIG. 20, if the incident light arrives at the light receiving surface of the rear-irradiation CMOS image sensor 31 in a direction perpendicular to the surface, in the case of a photodiode design providing a large amount of crosstalk caused by a leak of signal electric charge on the surface of the rear-irradiation CMOS image sensor 31, the amount of the crosstalk for small wavelengths increases. That is to say, the crosstalk exhibits a wavelength dependence characteristic.

As shown in FIG. 21, if the incident light arrives at the light receiving surface of the rear-irradiation CMOS image sensor 31 in an inclined direction with respect to the surface, on the other hand, the amount of the crosstalk for large wavelengths increases too. That is to say, the amount of generated crosstalk changes in accordance with the incidence angle and the photodiode design. Thus, in order to correct the crosstalk more effectively, it is necessary to properly change the correction matrixes and hold the changed correction matrixes in the matrix holding memory 61.

FIG. 22 is a diagram showing typical correction matrixes required for an incidence angle of ten degrees and typical correction matrixes for an incidence angle of 20 degrees. The incidence angle is defined as an angle between the incidence direction and the direction perpendicular to the light receiving surface. For example, when the main light-beam angle is four out of ten of image light, the incidence angle is ten degrees. When the main light-beam angle is eight out of ten of image light, on the other hand, the incidence angle is 20 degrees.

Each of the correction matrixes shown in FIG. 22 is a matrix obtained for a configuration in which the incidence surface is parallel to the x axis oriented in the horizontal direction. In comparison with the correction matrixes shown in FIG. 9 as correction matrixes for the field-angle center, the correction matrixes required for the incidence angles of ten and 20 degrees representing incidence directions are each composed of elements each having a different value to a large extent. In particular, at the incidence angles of ten and 20 degrees, the incident light is inclined in a direction increasing the crosstalk to the adjacent pixel located on the right side. Thus, as is obvious from FIG. 22, on the right-side column of each of the correction matrixes shown in FIG. 22, elements each having a large absolute value are included. As described above, a correction matrix for a pixel is composed of elements each having a value determined in accordance with the incidence direction of the incident light as a value peculiar to the pixel. For example, the value of an element included in a correction matrix for a pixel at the center of the light receiving surface is different from the value of an element included in a correction matrix for a pixel on an edge of the light receiving surface. Thus, crosstalk can be corrected properly all over the entire surface of the imaging device 44.

FIG. 23 is a diagram showing typical SNR10 values obtained before and after correction of crosstalk by application of the correction matrixes for incidence angles of zero, ten and 20 degrees. As described above, the value of each element included in a correction matrix for an incidence angle of incident light is different from the value of each element included in a correction matrix for another incidence angle. In FIG. 23, the horizontal axis represents the incidence angle expressed in terms of degrees whereas the vertical axis represents the SNR10 value expressed in terms of luxes.

As is obvious from FIG. 23, for all incidence directions, that is, for the incidence angles of zero, ten and 20 degrees, the SNR10 values can be made equal to or smaller than 175.0 luxes. That is to say, the SNR can be improved for all field angles. In addition, it is also obvious that, the larger the incidence angle representing the incidence direction becomes, the more the SNR10 value is improved.

As described above, this embodiment implements a solid-state imaging device employing color filters laid out to form the most general Bayer array. It is to be noted, however, that a typical solid-state imaging device employing no color filters is capable of correcting crosstalk more easily without requiring use of different correction matrixes provided for different pixel colors.

In addition, the crosstalk correction making use of correction matrixes can also be applied to a configuration employing supplementary-color filters and a configuration including color filters laid out to form an array other than the Bayer array. A typical example of the array other than the Bayer array is a clear-bit array. In other words, the crosstalk correction making use of correction matrixes can be applied to a broad range of configurations.

On top of that, the image processing apparatus 46 described above can be applied to a variety of electronic equipment such as an imaging system, a hand phone provided with an imaging function and another electronic apparatus provided with an imaging function. Typical examples of the imaging system are a digital still camera and a digital video camera.

In addition, the embodiment described above is no more than a typical configuration in which the rear-irradiation CMOS image sensor 31 is employed to serve as the imaging device 44. However, the imaging device 44 can also be typically the front-irradiation CMOS image sensor 21 shown in FIG. 1B or a CCD solid-state imaging device.

The series of processes described previously can be carried out by hardware and/or execution of software. If the series of processes described above is carried out by execution of software, programs composing the software can be installed into a computer embedded in dedicated hardware, a general-purpose personal computer or the like from typically a network or a removable recording medium. A general-purpose personal computer is a personal computer, which can be made capable of carrying out a variety of functions by installing a variety of programs into the personal computer. In the following description, the computer embedded in dedicated hardware and the personal computer are referred to simply as a computer which is used to carry out the functions of the image processing apparatus provided by the present technology.

In the computer, a CPU (Central Processing Unit) carries out the series of processes described above by execution of programs stored in a ROM (Read Only Memory) or programs loaded from a storage section into a RAM (Random Access Memory). Typical examples of the storage section are a hard disk and a nonvolatile memory.

The programs to be executed by the CPU is stored in the ROM and/or the storage section in advance. As an alternative, the programs can also be downloaded from a program provider into the computer by way of a communication section including a network interface to be installed in the storage section. As another alternative, the programs can also be installed in the storage section from a removable recording medium driven by a drive employed in the computer. Typical examples of the removable recording medium are the magnetic disk such as a flexible disk, an optical disk such as a CD-ROM (Compact Disk-Read Only Memory) or a DVD (Digital Versatile Disk), a magneto-optical disk as well as a semiconductor memory.

On top of that, the programs to be executed by the CPU can be programs to be executed to carry out processes along the time axis in the order explained in the specification of the present technology, programs to be executed to carry out processes concurrently or programs to be invoked with required timings to carry out processes with the timings. In addition, the programs can be executed by one CPU or a plurality of CPUs in a distributed-processing environment.

It is to be noted that implementations of the present technology are by no means limited to this embodiment. That is to say, the embodiment can be changed to a variety of any different modified versions as far as the modified versions fall within a range not deviating from spirit of the present technology.

The present application contains subject matter related to that disclosed in Japanese Priority Patent Application JP 2011-028631 filed in the Japan Patent Office on Feb. 14, 2011, the entire content of which is hereby incorporated by reference.

What is claimed is:

1. An image processing apparatus comprising:
a storage section configured to store a correction matrix correcting crosstalk generated by a light or electron leak from an adjacent pixel existing among a plurality of pixels for receiving light in an imaging device;
a processing section configured to carry out processing to apply said correction matrix stored in said storage section to an image signal generated by said imaging device for each of said pixels;
an aperture-ratio acquisition section; and
a correction-matrix generation section, wherein
said storage section stores a basic matrix found for an incidence angle of light incident to the light receiving surface of said imaging device;
said aperture-ratio acquisition section acquires the aperture ratio of a lens for converging incident light on said light receiving surface of said imaging device;
said correction-matrix generation section reads out said basic matrix, which has been stored in said storage section for said incidence angle according to said aperture ratio acquired by said aperture-ratio acquisition section, from said storage section and generates said correction matrix from said basic matrix read out from said storage section according to the aperture ratio; and
said processing section carries out said processing by making use of said correction matrix generated by said correction-matrix generation section.

2. The image processing apparatus according to claim 1, wherein said basic matrix is one of a plurality of basic matrixes stored in said storage section respectively found for one of a plurality of incidence angles separated away from each other by five degrees.

3. The image processing apparatus according to claim 1 wherein said correction matrix is configured to include:
a first matrix for crosstalk generated due to light which leaks to an adjacent pixel while said light is propagating inside said imaging device; and
a second matrix for crosstalk generated due to a leak of electrons in a photodiode included in said imaging device.

4. The image processing apparatus according to claim 1 wherein said correction matrix is found for each of colors of color filters employed in said imaging device.

5. The image processing apparatus according to claim 1 wherein said correction matrix is a matrix including three rows and three columns.

6. An image processing apparatus comprising:
a storage section configured to store a correction matrix correcting crosstalk generated by a light or electron leak from an adjacent pixel existing among a plurality of pixels for receiving light in an imaging device; and
a processing section configured to carry out processing to apply said correction matrix stored in said storage section to an image signal generated by said imaging device for each of said pixels,
wherein said storage section stores a plurality of correction matrixes each found for one of a plurality of incidence directions of light incident to the light receiving surface of said imaging device; and
said processing section carries out said processing by making use of said correction matrix for a given incidence direction from said plurality of incidence directions according to a position of at least one of the plurality of pixels on said imaging device.

7. An image processing method comprising:
reading out a correction matrix from a storage section for storing said correction matrix for correcting crosstalk generated by a light or electron leak from an adjacent pixel existing among a plurality of pixels for receiving light in an imaging device, said storage section storing a basic matrix for an incidence angle of light incident to the light receiving surface of said imaging device;

acquiring, by an aperture-ratio acquisition section, the aperture ratio of a lens for converging incident light on said light receiving surface of said imaging device;

reading out, by a correction-matrix generation section, said basic matrix, which has been stored in said storage section for said incidence angle according to said aperture ratio acquired by said aperture-ratio acquisition section, from said storage section and generating said correction matrix from said basic matrix read out from said storage section according to the aperture ratio; and carrying out processing to apply said correction matrix generated from said basic matrix to an image signal generated by said imaging device for each of said pixels.

8. The image processing method according to claim 7, wherein said basic matrix is one of a plurality of basic matrixes stored in said storage section respectively found for one of a plurality of incidence angles separated away from each other by five degrees.

9. The image processing method according to claim 7, wherein said correction matrix is configured to include a first matrix for crosstalk generated due to light which leaks to an adjacent pixel while said light is propagating inside said imaging device and a second matrix for crosstalk generated due to a leak of electrons in a photodiode included in said imaging device.

10. The image processing method according to claim 7, wherein said correction matrix is found for each of colors of color filters employed in said imaging device.

11. The image processing method according to claim 7, wherein said correction matrix is a matrix including three rows and three columns.

12. Electronic equipment comprising:
an imaging device having a plurality of pixels for receiving light;
a storage section configured to store a correction matrix for correcting crosstalk generated by a light or electron leak from an adjacent pixel existing among said pixels employed in said imaging device; and
a processing section configured to carry out processing to apply said correction matrix stored in said storage section to an image signal generated by said imaging device for each of said pixels an aperture-ratio acquisition section; and
a correction-matrix generation section, wherein
said storage section stores a basic matrix found for an incidence angle of light incident to the light receiving surface of said imaging device;
said aperture-ratio acquisition section acquires the aperture ratio of a lens for converging incident light on said light receiving surface of said imaging device;
said correction-matrix generation section reads out said basic matrix, which has been stored in said storage section for said incidence angle according to said aperture ratio acquired by said aperture-ratio acquisition section, from said storage section and generates said correction matrix from said basic matrix read out from said storage section according to the aperture ratio; and
said processing section carries out said processing by making use of said correction matrix generated by said correction-matrix generation section.

13. The electronic equipment according to claim 12, wherein said basic matrix is one of a plurality of basic matrixes stored in said storage section respectively found for one of a plurality of incidence angles separated away from each other by five degrees.

14. The electronic equipment according to claim 12, wherein said correction matrix is configured to include:
a first matrix for crosstalk generated due to light which leaks to an adjacent pixel while said light is propagating inside said imaging device; and
a second matrix for crosstalk generated due to a leak of electrons in a photodiode included in said imaging device.

15. The electronic equipment according to claim 12, wherein said correction matrix is found for each of colors of color filters employed in said imaging device.

16. The electronic equipment according to claim 12, wherein said correction matrix is a matrix including three rows and three columns.

* * * * *